US011974052B2

United States Patent
Xiao et al.

(10) Patent No.: US 11,974,052 B2
(45) Date of Patent: Apr. 30, 2024

(54) ELECTRONIC DEVICE AND PICTURE PROCESSING METHOD EMPLOYING A LIGHT REFLECTIVE APPARATUS THAT REFLECTS A PICTURE FROM A DIRECTION CORRESPONDING TO A FRONT-FACING CAMERA TOWARD A DIRECTION CORRESPONDING WITH A REAR-FACING CAMERA

(71) Applicant: Huawei Technologies Co., Ltd., Shenzhen (CN)

(72) Inventors: Jing Xiao, Shenzhen (CN); Jianxin Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 17/520,490

(22) Filed: Nov. 5, 2021

(65) Prior Publication Data
US 2022/0060620 A1 Feb. 24, 2022

Related U.S. Application Data

(63) Continuation of application No. PCT/CN2020/083695, filed on Apr. 8, 2020.

(30) Foreign Application Priority Data

Jul. 26, 2019 (CN) .......................... 201910682629.1

(51) Int. Cl.
*H04N 5/335* (2011.01)
*G03B 11/04* (2021.01)
(Continued)

(52) U.S. Cl.
CPC ......... *H04N 23/951* (2023.01); *G03B 11/043* (2013.01); *H04N 23/65* (2023.01); *H04N 23/667* (2023.01); *H04N 23/69* (2023.01)

(58) Field of Classification Search
CPC ..................................................... H04N 23/69
See application file for complete search history.

(56) References Cited

U.S. PATENT DOCUMENTS

| 2010/0087226 | A1 | 4/2010 | Wu | |
|---|---|---|---|---|
| 2011/0081946 | A1* | 4/2011 | Singh | H04M 1/0264 359/857 |

(Continued)

FOREIGN PATENT DOCUMENTS

| CN | 105049687 A | 11/2015 |
|---|---|---|
| CN | 105376471 A | 3/2016 |

(Continued)

OTHER PUBLICATIONS

Chen Hongyu, "The Mystery of the Trend of Dual Camera Systems in Smartphones," Digital Communication World, Issue 12, total 3 pages (2017). With English abstract.

*Primary Examiner* — Gary C Vieaux
(74) *Attorney, Agent, or Firm* — Leydig, Voit & Mayer, Ltd.

(57) ABSTRACT

Embodiments of this application provide an electronic device and a picture processing method. The electronic device includes a rear cover, a front-facing camera, a rear-facing camera, and a light reflective apparatus. The light reflective apparatus may be switched between a usage state and an idle state. The picture processing method includes: controlling the light reflective apparatus to switch from the idle state to the usage state, so that the rear-facing camera captures a picture reflected by the light reflective apparatus; separately obtaining a picture captured by the front-facing camera and a picture captured by the rear-facing camera; processing the picture captured by the rear-facing camera; and fusing the picture captured by the front-facing camera and a picture obtained by processing the picture captured by (Continued)

the rear-facing camera. In this application, a field of view of a picture taken by the front-facing camera can be increased with relatively low costs.

10 Claims, 18 Drawing Sheets

(51) Int. Cl.
  *H04N 23/65* (2023.01)
  *H04N 23/667* (2023.01)
  *H04N 23/69* (2023.01)
  *H04N 23/951* (2023.01)

(56) References Cited

U.S. PATENT DOCUMENTS

| | | | |
|---|---|---|---|
| 2014/0218587 A1* | 8/2014 | Shah | H04N 23/55 |
| | | | 348/340 |
| 2015/0062416 A1 | 3/2015 | Vance | |
| 2015/0199871 A1* | 7/2015 | Czyzewski | H04N 23/90 |
| | | | 463/25 |
| 2016/0219199 A1 | 7/2016 | Streuter et al. | |
| 2017/0365092 A1 | 12/2017 | Wang | |
| 2018/0035031 A1* | 2/2018 | Kwak | H04N 23/55 |
| 2021/0314467 A1* | 10/2021 | Kramer | G03B 17/54 |

FOREIGN PATENT DOCUMENTS

| | | |
|---|---|---|
| CN | 105704355 A | 6/2016 |
| CN | 106375502 A | 2/2017 |
| CN | 106550181 A | 3/2017 |
| CN | 106713768 A | 5/2017 |
| CN | 107529052 A | 12/2017 |
| CN | 107613163 A | 1/2018 |
| CN | 206977555 U | 2/2018 |
| CN | 108055513 A | 5/2018 |
| CN | 207638761 U | 7/2018 |
| CN | 207968590 U | 10/2018 |
| CN | 208509057 U | 2/2019 |
| CN | 109788181 A | 5/2019 |
| CN | 208862941 U | 5/2019 |
| CN | 109889635 A | 6/2019 |
| WO | 2018030622 A1 | 2/2018 |
| WO | 2019027369 A1 | 2/2019 |

* cited by examiner

ELECTRONIC DEVICE AND PICTURE PROCESSING METHOD EMPLOYING A LIGHT REFLECTIVE APPARATUS THAT REFLECTS A PICTURE FROM A DIRECTION CORRESPONDING TO A FRONT-FACING CAMERA TOWARD A DIRECTION CORRESPONDING WITH A REAR-FACING CAMERA

CROSS-REFERENCE TO RELATED APPLICATIONS

This application is a continuation of International Application No. PCT/CN2020/083695, filed on Apr. 8, 2020, which claims priority to Chinese Patent Application No. 201910682629.1, filed on Jul. 26, 2019. The disclosures of the aforementioned applications are hereby incorporated by reference in their entireties.

TECHNICAL FIELD

This application relates to the field of communications technologies, and in particular, to an electronic device and a picture processing method in a communications product.

BACKGROUND

With the development of the Internet and the increase of an intelligence degree of electronic devices (for example, mobile phones and tablet computers), the electronic devices have more functions. Especially, there are more applications on the electronic devices. A video call function in an instant messaging application is welcome by many users because the video call function can increase intimacy between both parties in a call and strengthen a relationship between the parties. Currently, in a video call, a local electronic device enables a front-facing camera, captures a picture of a local user, encodes and compresses the picture, and sends the processed picture to a peer electronic device over a network; and the peer electronic device decodes the processed picture, and displays the picture on a screen.

However, generally, the user holds the electronic device by using a hand. Therefore, the front-facing camera is usually very close to the user. In this case, photographed content in the entire picture is concentrated on mainly the upper part or even the entire face of the user, and content displayed on the electronic device of a peer user is also mainly the upper part or even the entire face of the local user, causing poor user experience.

SUMMARY

Embodiments of this application disclose an electronic device and a picture processing method, to improve a field of view of a picture taken by a front-facing camera in a video call, thereby improving user experience.

The foregoing objectives and other objectives may be achieved by using features in independent claims. Further implementations are reflected in the dependent claims, the specification, and the accompanying drawings.

According to a first aspect, an embodiment of this application discloses an electronic device, including a display screen, a rear cover, a front-facing camera on a side facing the display screen, and a rear-facing camera on a side facing the rear cover. The electronic device further includes a light reflective apparatus connected to the rear cover. The light reflective apparatus may be switched between a usage state and an idle state. When the light reflective apparatus is in the usage state, the light reflective apparatus is located on an object-facing side of the rear-facing camera and is configured to reflect a picture in a direction in which the front-facing camera is located, so that the rear-facing camera captures the picture reflected by the light reflective apparatus. The object-facing side indicates a side on which the rear-facing camera faces a photographed object.

The electronic device in this embodiment of this application includes the light reflective apparatus that is configured to reflect the picture in the direction in which the front-facing camera is located, so that the rear-facing camera can capture the picture reflected by the light reflective apparatus. In this way, a field of view of a picture taken by the front-facing camera can be expanded by fusing a picture taken by the rear-facing camera and a picture taken by the front-facing camera, to improve visual experience of a user when the user makes a video call by using the electronic device.

In some implementations, the light reflective apparatus is a light reflective film made of a flexible material. The electronic device further includes a drive component disposed in the rear cover. The light reflective apparatus is connected to the rear cover through rotation by using the drive component. The drive component drives the light reflective apparatus to move, so that the light reflective apparatus is switched between the usage state and the idle state. In this implementation, the light reflective apparatus has a light weight because the light reflective apparatus is the light reflective film made of the flexible material. Therefore, the light reflective apparatus can be driven by relatively small driving force, and can implement approximately full light reflection.

In some implementations, to improve precision in controlling movement of the light reflective apparatus, the drive component includes a drive part, a convey part, and a fastener. One end of the convey part is mounted on the drive part, and the other end is connected to the fastener. The light reflective apparatus is disposed at an end that is of the fastener and that is away from the convey part. The drive part is configured to drive the convey part to rotate, to drive the fastener to move and further drive the light reflective apparatus to move to the object-facing side of the rear-facing camera, so that the light reflective apparatus is in the usage state.

In some implementations, in order that normal use of the rear-facing camera of the electronic device in another state is not affected, the drive part is further configured to drive the convey part to rotate, to drive the fastener to move and further drive the light reflective apparatus to move away from the object-facing side of the rear-facing camera, so that the light reflective apparatus is in the idle state.

In some implementations, the electronic device further includes a lens protection cover. The lens protection cover is mounted on the rear cover and corresponds to the rear-facing camera. When the light reflective apparatus is in the usage state, the light reflective apparatus is in a specified shape and is fitted to an inner wall of the lens protection cover. In this way, the light reflective apparatus can be protected. The inner wall of the lens protection cover indicates a surface that is of the lens protection cover and that faces the rear-facing camera.

In some implementations, the electronic device further includes a carrier fixedly connected to the rear cover. The light reflective apparatus is a light reflective layer coated on the carrier. When the light reflective apparatus is in the usage state, the light reflective apparatus is in a translucent mode when being powered on. In this implementation, because a position of the light reflective layer is fixed, mechanical transmission is not required. In this way, precision is relatively high, and a requirement for a process is relatively low. This is relatively easy to implement.

In an implementation, the light reflective layer is made of an electroluminescent material.

In some implementations, in order that normal use of the rear-facing camera of the electronic device in another state is not affected, when the light reflective apparatus is in the idle state, the light reflective apparatus is in a transparent mode when being powered off In some implementations, to reduce product costs, the carrier is a lens protection cover that is mounted on the rear cover and that corresponds to the rear-facing camera.

In some implementations, the light reflective apparatus is a reflector, and the electronic device further includes a carrier. The carrier is detachably mounted on the rear cover and corresponds to the rear-facing camera. When the light reflective apparatus is in the usage state, the carrier is mounted on the rear cover, so that the light reflective apparatus is located between the rear-facing camera and the carrier. In this implementation, because the carrier is detachably connected to the rear cover, the carrier may be detached and mounted according to a requirement of the user, to more flexibly meet the requirement of the user.

In some implementations, in order that normal use of the rear-facing camera of the electronic device in another state is not affected, when the light reflective apparatus is in the idle state, the carrier is detached from the rear cover. In addition, to reduce the product costs, the carrier is a lens protection cover.

In some implementations, to seamlessly connect the picture captured by the front-facing camera and the picture captured by the rear-facing camera during fusion, when the light reflective apparatus is in a convex lens shape, a distance s between a lens surface and the rear-facing camera should meet the following relationship: s>d1/tan(FOV1/2)—c, and s>d2/tan(FOV1/2)—c. Herein, d1 is a distance between the rear-facing camera and one side edge of the electronic device, d2 is a distance between the rear-facing camera and the other side edge of the electronic device, c is a distance between an optical center of the light reflective apparatus and the lens surface, and FOV1 is a field of view of the front-facing camera.

In another implementation, when the light reflective apparatus is in a prism shape, a distance s between a lens surface and the rear-facing camera should meet the following relationship: s>d1/tan(2α), and s>d2/tan(2α). Herein, d1 is a distance between the rear-facing camera and one side edge of the electronic device, d2 is a distance between the rear-facing camera and the other side edge of the electronic device, and a is an included angle between an imaging plane of the light reflective apparatus and a horizontal plane of the light reflective apparatus.

In some implementations, the electronic device further includes a processor. The processor is electrically connected to the light reflective apparatus. The processor is configured to: control the light reflective apparatus to switch from the idle state to the usage state, when an operation that a user enables the front-facing camera is detected; separately obtain the picture captured by the front-facing camera and the picture captured by the rear-facing camera; and process the picture captured by the rear-facing camera. The processor is further configured to fuse the picture captured by the front-facing camera and a picture obtained by processing the picture captured by the rear-facing camera.

In some implementations, that the processor processes the picture captured by the rear-facing camera specifically includes: the processor performs picture restoration on the deformed picture captured by the rear-facing camera, and/or the processor removes a picture corresponding to the rear cover part. In this way, interference caused by the picture corresponding to the rear cover in a subsequent picture composition process can be eliminated.

In some implementations, that the processor is configured to fuse the picture captured by the front-facing camera and the picture obtained by processing the picture captured by the rear-facing camera includes: the processor determines and tags an overlapping region between the picture captured by the front-facing camera and the picture obtained by processing the picture captured by the rear-facing camera; the processor aligns and fuses, based on a tagged position, the picture captured by the front-facing camera and the picture obtained by processing the picture captured by the rear-facing camera; and the processor crops and/or scales down the fused picture, to obtain a composite picture. In the method, a smooth connection can be implemented on the fused picture, to further improve visual experience of the user.

In some implementations, when a height of the picture obtained by processing the picture captured by the rear-facing camera is different from a height of the picture captured by the front-facing camera, the processor further uses the height of the picture with the smaller height as a reference height, and crops the picture with the height exceeding the reference height. In this way, quality of the composite picture can be improved. In addition, the following case is avoided: a part of the picture protrudes or is missed.

In some implementations, that the processor controls the light reflective apparatus to switch from the idle state to the usage state when the operation that the user enables the front-facing camera is detected includes: when the operation that the user enables the front-facing camera is detected, the processor determines a state of a peer electronic device; and when it is determined that the peer electronic device is in a landscape mode, the processor is further configured to control the light reflective apparatus to switch from the idle state to the usage state.

According to a second aspect, an embodiment of this application discloses a picture processing method, applied to an electronic device. The electronic device includes a display screen, a rear cover, a front-facing camera on a side facing the display screen, and a rear-facing camera on a side facing the rear cover. The electronic device further includes a light reflective apparatus. The light reflective apparatus may be switched between a usage state and an idle state. The picture processing method includes: controlling the light reflective apparatus to switch from the idle state to the usage state, when an operation that a user enables the front-facing camera is detected, where when the light reflective apparatus is in the usage state, the light reflective apparatus is located on an object-facing side of the rear-facing camera and is configured to reflect a picture in a direction in which the front-facing camera is located, so that the rear-facing camera captures the picture reflected by the light reflective apparatus, and the object-facing side indicates a side on which the rear-facing camera faces a photographed object; separately obtaining a picture captured by the front-facing camera and a picture captured by the rear-facing camera; processing the picture captured by the rear-facing camera; and fusing the picture captured by the front-facing camera and a picture obtained by processing the picture captured by the rear-facing camera.

In the picture processing method disclosed in this embodiment of this application, when the user makes a video call by using instant messaging software and enables the front-facing camera, the light reflective apparatus is controlled to be in the usage state, and the picture that is in the light reflective apparatus and that is captured by the rear-facing camera is processed. The picture captured by the front-facing camera and the picture obtained by processing the picture captured by the rear-facing camera are fused, to expand a field of view of the picture taken by the front-facing camera. In this way, during the video call, a peer user can see more about a local user, instead of only a picture of the upper part of the local user, to improve video call experience of the user.

In some implementations, the processing the picture captured by the rear-facing camera specifically includes: performing picture restoration on the deformed picture captured by the rear-facing camera, and/or removing a picture corresponding to the rear cover part. In this way, interference caused by the picture corresponding to the rear cover in a subsequent picture composition process can be eliminated.

In some implementations, the fusing the picture captured by the front-facing camera and a picture obtained by processing the picture captured by the rear-facing camera includes: determining and tagging an overlapping region between the picture captured by the front-facing camera and the picture obtained by processing the picture captured by the rear-facing camera; aligning and fusing, based on a tagged position, the picture captured by the front-facing camera and the picture obtained by processing the picture captured by the rear-facing camera; and cropping and/or scaling down the fused picture, to obtain a composite picture. In the method, a smooth connection can be implemented on the fused picture, to further improve visual experience of the user.

In some implementations, when a height of the picture obtained by processing the picture captured by the rear-facing camera is different from a height of the picture captured by the front-facing camera, the height of the picture with the smaller height is used as a reference height, and the picture with the height exceeding the reference height is cropped. In this way, quality of the composite picture can be improved. In addition, the following case is avoided: a part of the picture protrudes or is missed.

In some implementations, the controlling the light reflective apparatus to switch from the idle state to the usage state, when an operation that a user enables the front-facing camera is detected includes: when the operation that the user enables the front-facing camera is detected, determining a state of a peer electronic device; and when it is determined that the peer electronic device is in a landscape mode, controlling the light reflective apparatus to switch from the idle state to the usage state. The "landscape mode" indicates a mode in which a length of the electronic device in a horizontal direction is greater than a length of the electronic device in a vertical direction. In this implementation, the picture processing method in this embodiment of this application is performed only when it is detected that the peer electronic device is in the landscape mode, to better meet a requirement of the user.

According to a third aspect, an embodiment of this application discloses a computer-readable storage medium. The computer storage medium stores program instructions. The program instructions are used for invoking and performing the picture processing method in the second aspect.

According to a fourth aspect, this application provides a computer program product including instructions. When the computer program product is run on an electronic device, the electronic device is enabled to perform the method described in possible implementations of the second aspect.

BRIEF DESCRIPTION OF DRAWINGS

To describe the technical solutions in the embodiments of this application or in the background, the following briefly describes the accompanying drawings for describing the embodiments of this application or the background.

DESCRIPTION OF EMBODIMENTS

Figure 1:
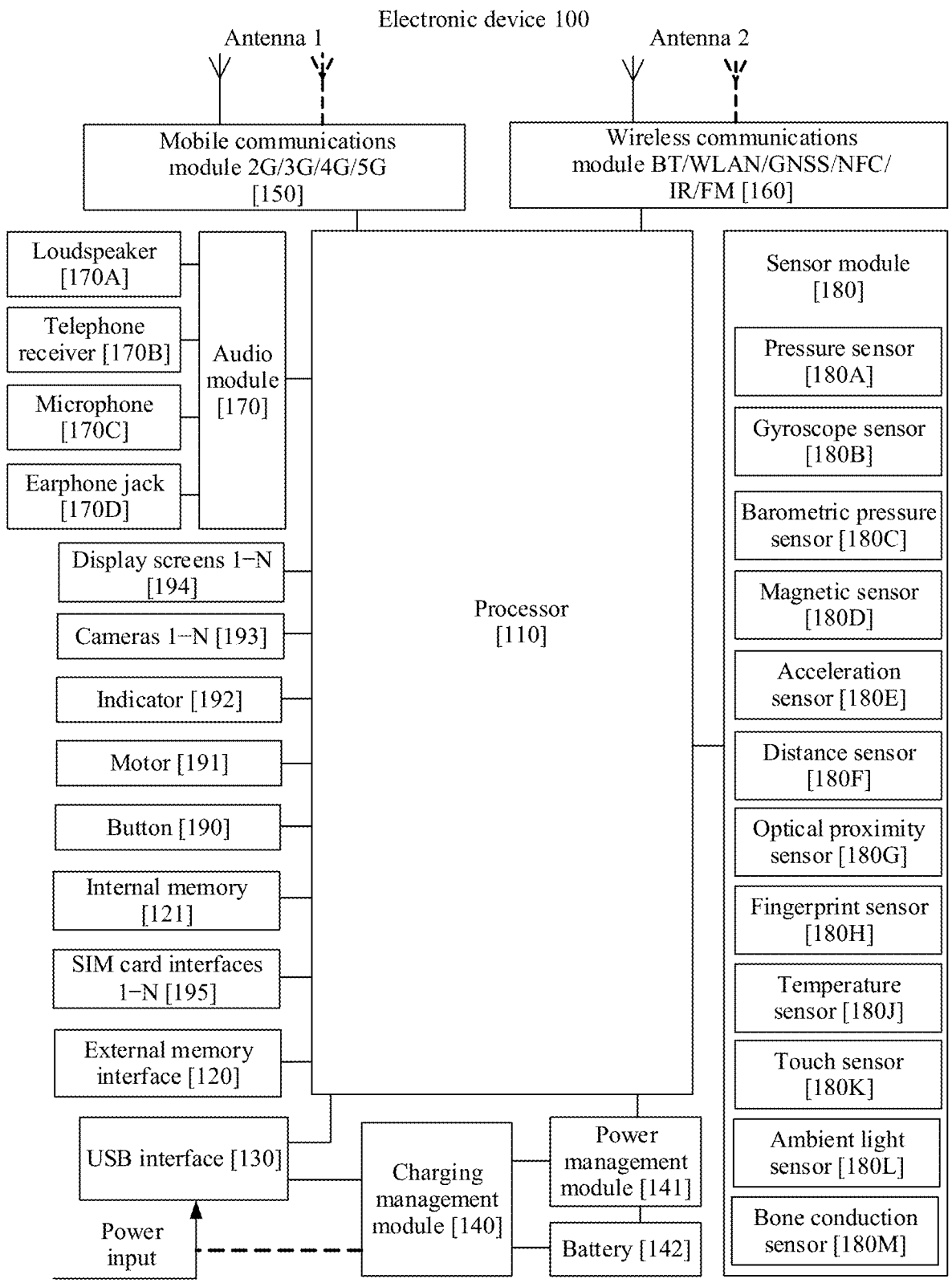
FIG. 1 is a schematic structural diagram of an electronic device according to an embodiment of this application.

This application provides an electronic device and a picture processing method applied to the electronic device. When a user makes a video call by using instant messaging software, the electronic device may perform the picture processing method to process a picture captured by a front-facing camera of the electronic device, to implement an effect of expanding a field of view (FOV) of the picture captured by the front-facing camera, thereby improving experience of the user when the user makes the video call by using the instant messaging software.

The electronic device may be a portable electronic device such as a mobile phone, a tablet computer, a personal digital assistant (PDA), or a wearable device. An example embodiment of the portable electronic device includes but is not limited to a portable electronic device using iOS, Android, Microsoft, or another operating system. The portable electronic device may alternatively be another portable electronic device such as a laptop computer having a touch-sensitive surface (for example, a touch panel). It should be further understood that, in some other embodiments of this application, the electronic device 100 may not be a portable electronic device, but is a desktop computer, or a vehicle-mounted device having a touch-sensitive surface (for example, a touch panel), or the like. This is not limited in the embodiments of this application.

In the embodiments of this application, the instant messaging software is software for implementing online chatting and online communication by using an instant messaging technology. For example, APPs such as WeChat, QQ, Facebook, Skype, and MSN belong to the instant messaging software.

In the embodiments of this application, under a condition that a "FOV expansion" function of the electronic device is enabled, when the user makes the video call by using the instant messaging software, the electronic device may perform the picture processing method to process the picture captured by the front-facing camera of the electronic device, to implement the effect of expanding the field of view of the picture captured by the front-facing camera, thereby improving experience of the user when the user makes the video call by using the instant messaging software. However, under a condition that the "FOV expansion" function is disabled, when the user makes the video call by using the instant messaging software, the electronic device does not perform the picture processing method, that is, the electronic device does not process the picture captured by the front-facing camera. In this case, the field of view of the picture taken by the front-facing camera does not change. In the embodiments of this application, the user may determine according to a requirement of the user whether the "FOV expansion" function needs to be enabled, to better meet the requirement of the user, thereby improving user experience.

Herein, the "FOV expansion" function may be a service or a function provided by the electronic device, and may be installed on the electronic device in a form of an APP. In the embodiments of this application, the "FOV expansion" function may support the electronic device in expanding the field of view of the picture captured by the front-facing camera when the user makes the video call by using the instant messaging software. In the embodiments of this application, that the electronic device expands the field of view of the picture captured by the front-facing camera when the user makes the video call by using the instant messaging software indicates that a peer party of the video call sees more scenario content instead of only the upper part or even the entire face of a local user when the user makes the video call by using the instant messaging software. Herein, for a manner in which the "FOV expansion" function supports the "FOV expansion" function provided by the electronic device when the user makes the video call by using the instant messaging software, refer to related descriptions in the following embodiments. Details are not described herein.

It should be understood that, the "FOV expansion" is merely a phrase used in the embodiments, and a meaning represented by the "FOV expansion" is described in the embodiments. A name of the "FOV expansion" does not limit the embodiments.

The following first describes an example of an electronic device 100 in the following embodiment of this application.

FIG. 1 is a schematic structural diagram of the electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, a earphone jack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the electronic device 100. In some other embodiments of this application, the electronic device 100 may include more or fewer components than those shown in the figure; or in the electronic device 100, some components may be combined, or some components may be split, or components are disposed in different manners. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be separate components, or may be integrated into one or more processors.

The controller may generate an operation control signal based on instruction operation code and a time sequence signal, to complete control of instruction reading and instruction execution.

The memory may be further disposed in the processor 110, to store instructions and data. In some embodiments, the memory in the processor 110 is a cache. The memory may store instructions or data that is used or cyclically used by the processor 110. If the processor 110 needs to use the instructions or the data again, the processor 110 may directly invoke the instructions or the data from the memory, to avoid repeated access and reduce a waiting time of the processor 110, thereby improving system efficiency.

In some embodiments, the processor 110 may include one or more interfaces. The interface may include an integrated circuit (inter-integrated circuit, I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

In this embodiment of this application, the processor 110 may be configured to determine whether instant messaging software currently enabled in the electronic device 100 has permission to use an enhancement function of the electronic device. In some embodiments, the processor 110 may be further configured to determine the enhancement function currently provided for the user when the currently enabled instant messaging software has the permission to use the enhancement function of the electronic device. For a manner in which the processor 110 determines the enhancement function currently provided for the user, refer to related descriptions in the following embodiment. Details are not described herein.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like over different I2C bus interfaces. For example, the processor 110 may be coupled to the touch sensor 180K over the I2C interface, so that the processor 110 communicates with the touch sensor 180K over the I2C bus interface, to implement a touch function of the electronic device 100.

The I2S interface may be used for audio communication. In some embodiments, the processor 110 may include a plurality of groups of I2S buses. The processor 110 may be coupled to the audio module 170 over an I2S bus, to implement communication between the processor 110 and the audio module 170. In some embodiments, the audio module 170 may transmit an audio signal to the wireless communications module 160 over an I2S interface, to implement a function of answering a call over a Bluetooth earphone.

The PCM interface may also be used for audio communication, to perform sampling, quantization, and encoding on an analog signal. In some embodiments, the audio module 170 may be coupled to the wireless communications module 160 over the PCM bus interface. In some embodiments, the audio module 170 may also transmit an audio signal to the wireless communications module 160 over the PCM interface, to implement a function of answering a call over a Bluetooth earphone. Both the I2S interface and the PCM interface may be used for audio communication.

The UART interface is a universal serial data line, and is used for asynchronous communication. The bus may be a two-way communications bus. The UART interface switches to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 over the UART interface, to implement a Bluetooth function. In some embodiments, the audio module 170 may transmit an audio signal to the wireless communications module 160 over the UART interface, to implement a function of playing music over a Bluetooth earphone.

The MIPI interface may be configured to connect the processor 110 to a peripheral component such as the display screen 194 or the camera 193. The MIPI interface includes a camera serial interface (CSI), a display serial interface (DSI), and the like. In some embodiments, the processor 110 communicates with the camera 193 over the CSI interface, to implement a photographing function of the electronic device 100. The processor 110 communicates with the display screen 194 over the DSI interface, to implement a display function of the electronic device 100.

The GPIO interface may be configured by using software. The GPIO interface may be configured as a control signal, or may be configured as a data signal. In some embodiments, the GPIO interface may be configured to connect to the processor 110, the camera 193, the display screen 194, the wireless communications module 160, the audio module 170, the sensor module 180, and the like. The GPIO interface may be further configured as an I2C interface, an I2S interface, a UART interface, a MIPI interface, or the like.

The USB interface 130 is an interface that meets a USB standard specification, and may be specifically a mini USB interface, a micro USB interface, a USB type C interface, or the like. The USB interface 130 may be configured to connect to the charger to charge the electronic device 100, or may be configured to transmit data between the electronic device 100 and a peripheral device, or may be configured to connect to an earphone, to play audio by using the earphone. The interface may be further configured to connect to another electronic device such as an AR device.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from the charger. The charger may be a wireless charger, or may be a wired charger. In some embodiments in which the charger is a wired charger, the charging management module 140 may receive charging input from the wired charger over the USB interface 130. In some embodiments in which the charger is a wireless charger, the charging management module 140 may receive charging input from the wireless charger over a wireless charging coil of the electronic device 100. When charging the battery 142, the charging management module 140 may further supply power to the electronic device over the power management module 141.

The power management module 141 is configured to connect the battery 142, the charging management module 140, and the processor 110. The power management module 141 receives input of the battery 142 and/or the charging management module 140, to supply power to the processor 110, the internal memory 121, the display screen 194, the camera 193, the wireless communications module 160, and the like. The power management module 141 may be further configured to monitor parameters such as a battery capacity, a battery cycle count, and a battery state of health (e.g., electric leakage and impedance). In some other embodiments, the power management module 141 may be alternatively disposed in the processor 110. In some other embodiments, the power management module 141 and the charging management module 140 may be alternatively disposed in the same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may be multiplexed to improve utilization of the antennas. For example, the antenna 1 may be multiplexed as a diversity antenna of a wireless local area network. In some other embodiments, the antenna may be used in combination with a tuning switch.

The mobile communications module 150 may provide a solution to wireless communication such as 2G/3G/4G/5G applied to the electronic device 100. The mobile communications module 150 may include at least one filter, a switch, a power amplifier, a low noise amplifier (LNA), and the like. The mobile communications module 150 may receive an electromagnetic wave over the antenna 1, perform processing such as filtering and amplification on the received electromagnetic wave, and transmit the processed electromagnetic wave to the modem processor for demodulation. The mobile communications module 150 may further amplify a signal modulated by the modem processor, and convert the signal into an electromagnetic wave for radiation over the antenna 1. In some embodiments, at least some function modules of the mobile communications module 150 may be disposed in the processor 110. In some embodiments, at least some function modules of the mobile communications module 150 and at least some modules of the processor 110 may be disposed in the same component.

The modem processor may include a modulator and a demodulator. The modulator is configured to modulate a to-be-sent low-frequency baseband signal into an intermediate/or a high frequency signal. The demodulator is configured to demodulate a received electromagnetic wave signal into a low-frequency baseband signal. Then, the demodulator transmits the low-frequency baseband signal obtained after demodulation to the baseband processor for processing. After being processed by the baseband processor, the low-frequency baseband signal is transmitted to the application processor. The application processor outputs a sound signal over an audio device (which is not limited to the loudspeaker 170A, the telephone receiver 170B, and the like), or displays a picture or a video over the display screen 194. In some embodiments, the modem processor may be an independent component. In some other embodiments, the modem processor may be independent of the processor 110, and the modem processor and the mobile communications module 150 or another function module may be disposed in the same component.

The wireless communications module 160 may provide a solution to wireless communication applied to the electronic device 100, for example, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communications module 160 may be one or more components into which at least one communication processing module is integrated. The wireless communications module 160 receives an electromagnetic wave over the antenna 2, performs frequency modulation and filtering processing on an electromagnetic wave signal, and sends the processed signal to the processor 110. The wireless communications module 160 may further receive a to-be-sent signal from the processor 110, perform frequency modulation and amplification on the signal, and convert the signal into an electromagnetic wave for radiation over the antenna 2.

In some embodiments, the antenna 1 and the mobile communications module 150 of the electronic device 100 are coupled, and the antenna 2 and the wireless communications module 160 of the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function over the GPU, the display screen 194, the application processor, and the like. The GPU is a microprocessor for picture processing, and is connected to the display screen 194 and the application processor. The GPU is configured to perform mathematical and geometrical calculation, and is configured to perform graphics rendering. The processor 110 may include one or more GPUs, and execute program instructions to generate or change display information.

The display screen 194 is configured to display a picture, a video, and the like. The display screen 194 includes a display panel. The display panel may use a liquid crystal display (LCD), an organic light-emitting diode (OLED), an active-matrix organic light emitting diode (AMOLED), a flexible light-emitting diode (FLED), a Mini-LED, a Micro-LED, a Micro-OLED, a quantum dot light emitting diode (QLED), and the like. In some embodiments, the electronic device 100 may include one or N display screens 194, where N is a positive integer greater than 1.

In this embodiment of this application, the display screen 194 may be configured to display a control, and the control may be used to monitor an operation for expanding and displaying a control corresponding to an enhancement function currently provided by the electronic device. In response to this operation, the display screen 194 may be further configured to display a control corresponding to an enhancement function currently provided by the electronic device. The control corresponding to the enhancement function currently provided by the electronic device may be used to monitor an operation of enabling a corresponding enhancement function. For a manner in which the electronic device determines the enhancement function provided for the user, refer to related descriptions in the following embodiment. Details are not described herein.

The electronic device 100 may implement a photographing function over the ISP, the camera 193, the video codec, the GPU, the display screen 194, the application processor, and the like.

The ISP is configured to process data fed back by the camera 193. For example, during photographing, a shutter is pressed, a light ray is transmitted to a light-sensitive element of the camera through a lens, and an optical signal is converted into an electrical signal. The light-sensitive element of the camera transmits the electrical signal to the ISP for processing, and converts the electrical signal into a picture that can be seen. The ISP may further perform algorithm optimization on noise, luminance, and complexion in the picture. The ISP may further optimize parameters such as exposure and a color temperature of a photographing scenario. In some embodiments, the ISP may be disposed in the camera 193.

The camera 193 is configured to capture a static picture or a video. An optical picture of an object is generated through the lens. The picture is projected to the light-sensitive element. The light-sensitive element may be a charge coupled device (CCD) or a complementary metal-oxide-semiconductor (CMOS) phototransistor. The light-sensitive element converts an optical signal into an electrical signal, and then transmits the electrical signal to the ISP, so that the ISP converts the electrical signal into a digital picture signal. The ISP outputs the digital picture signal to the DSP for processing. The DSP converts the digital picture signal into a picture signal in a standard format such as RGB or YUV. In some embodiments, the electronic device 100 may include one or N cameras 193, where N is a positive integer greater than 1. In this embodiment of this application, the electronic device 100 includes at least one front-facing camera and/or at least one rear-facing camera.

The digital signal processor is configured to process a digital signal, and in addition to a digital picture signal, may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG) 1, MPEG-2, MPEG-3, and MPEG-4.

The NPU is a neural-network (NN) computing processor. The NPU quickly processes input information by using a biological neural network structure such as a mode of transmission between human-brain neurons, and may further constantly perform self-learning. The NPU may be used to implement an application such as intelligent cognition of the electronic device 100, for example, picture recognition, facial recognition, voice recognition, and text understanding.

The external memory interface 120 may be configured to connect to an external storage card such as a micro SD card, to extend a storage capability of the electronic device 100. The external storage card communicates with the processor 110 by using the external memory interface 120, to implement a data storage function. For example, a file such as a music file or a video file is stored in the external storage card.

The internal memory 121 may be configured to store computer executable program code. The executable program code includes instructions. The internal memory 121 may include a program storage region and a data storage region. The program storage region may store an operating system, an application required by at least one function (for example, a voice playing function or a picture playing function), and the like. The data storage region may store data (for example, audio data and an address book) and the like created when the electronic device 100 is used. In addition, the internal memory 121 may include a high-speed random access memory, or may include a non-volatile memory such as at least one magnetic disk memory, a flash memory, or universal flash storage (UFS). The processor 110 runs the instructions stored in the internal memory 121 and/or the instructions stored in the memory in the processor, to perform various function applications and data processing of the electronic device 100.

The electronic device 100 may implement an audio function such as music playing or recording over the audio module 170, the loudspeaker 170A, the telephone receiver 170B, the microphone 170C, the earphone jack 170D, the application processor, and the like.

The audio module 170 is configured to convert digital audio information into analog audio signal output, and is further configured to convert analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The loudspeaker 170A is also referred to as a "speaker", and is configured to convert an audio electrical signal into a sound signal. The electronic device 100 may be used to listen to music or answer a call in a hands-free mode over the loudspeaker 170A.

The telephone receiver 170B is also referred to as a "receiver", and is configured to convert an audio electrical signal into a sound signal. When the electronic device 100 is used to answer a call or receive voice information, the telephone receiver 170B may be put close to a human ear, to receive the voice information.

The microphone 170C is configured to convert a sound signal into an electrical signal. When making a call or sending voice information, the user may speak with the mouth approaching the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, recognize a sound source, implement a directional recording function, and the like.

The earphone jack 170D is configured to connect to a wired earphone. The earphone jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When force is exerted on the pressure sensor 180A, capacitance between electrodes changes. The electronic device 100 determines strength of pressure based on a change of the capacitance. When a touch operation is performed on the display screen 194, the electronic device

100 detects strength of the touch operation by using the pressure sensor 180A. The electronic device 100 may further calculate a position of the touch based on a detection signal of the pressure sensor 180A. In some embodiments, touch operations that are performed on the same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating an SMS message is executed.

The gyroscope sensor 180B may be configured to determine a motion posture of the electronic device 100. In some embodiments, the gyroscope sensor 180B may be used to determine angular velocities of the electronic device 100 around three axes (namely, x, y, and z axes). The gyroscope sensor 180B may be configured to implement picture stabilization during photographing. For example, when a shutter is pressed, the gyroscope sensor 180B detects a jittering angle of the electronic device 100, calculates, based on the angle, a distance for which a lens module needs to compensate, and enables the lens to offset uttering of the electronic device 100 through reverse motion, to implement picture stabilization. The gyroscope sensor 180B may be further used in a navigation scenario and a motion sensing game scenario.

The barometric pressure sensor 180C is configured to measure atmospheric pressure. In some embodiments, the electronic device 100 calculates an altitude based on a value of the atmospheric pressure measured by the barometric pressure sensor 180C, to assist in positioning and navigation.

The magnetic sensor 180D includes a Hall effect sensor. The electronic device 100 may detect opening and closing of a flip leather cover by using the magnetic sensor 180D. In some embodiments, when the electronic device 100 is a clamshell phone, the electronic device 100 may detect opening and closing of a shell by using the magnetic sensor 180D. Further, a feature such as automatic unlocking during the opening of the shell is set based on a detected open/closed state of the leather cover or a detected open/closed state of the shell.

The acceleration sensor 180E may detect a magnitude of acceleration of the electronic device 100 in various directions (usually on three axes). When the electronic device 100 is static, a value and a direction of gravity may be detected. The acceleration sensor 180E may be further configured to recognize a posture of the electronic device, and applied to applications such as landscape/portrait orientation switching and a pedometer.

The distance sensor 180F is configured to measure a distance. The electronic device 100 may measure a distance through infrared or laser. In some embodiments, in a photographing scenario, the electronic device 100 may measure a distance by using the distance sensor 180F, to implement quick focusing.

The optical proximity sensor 180G may include, for example, a light emitting diode (LED) and an optical detector such as a photodiode. The light emitting diode may be an infrared light emitting diode. The electronic device 100 may emit infrared light by using the light emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user puts the electronic device 100 close to an ear for conversation, so that automatic screen-off is implemented to save power. The optical proximity sensor 180G may be further configured to automatically unlock and lock the screen in a leather cover mode and a pocket mode.

The ambient light sensor 180L is configured to sense luminance of ambient light. The electronic device 100 may adaptively adjust luminance of the display screen 194 based on the sensed luminance of the ambient light. The ambient light sensor 180L may be further configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint unlock, application access lock, fingerprint photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 reduces performance of a processor near the temperature sensor 180J, to reduce power consumption and implement heat protection. In some other embodiments, when the temperature is lower than another threshold, the electronic device 100 heats the battery 142, to avoid an abnormal shutdown of the electronic device 100 caused by the low temperature. In some other embodiments, when the temperature is lower than still another threshold, the electronic device 100 boosts an output voltage of the battery 142, to avoid an abnormal shutdown caused by a low temperature.

The touch sensor 180K is also referred to as a "touch panel". The touch sensor 180K may be disposed in the display screen 194, and the touch sensor 180K and the display screen 194 constitute a touchscreen that is also referred to as a "touch control screen". The touch sensor 180K is configured to detect a touch operation performed on or near the touch sensor 180K. The touch sensor may transmit the detected touch operation to the application processor, to determine a touch event type. The touch sensor 180K may provide, over the display screen 194, visual output related to the touch operation. In some other embodiments, the touch sensor 180K may be alternatively disposed on a surface of the electronic device 100, and is located in a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may contact a human pulse, and receive a blood pressure beating signal. In some embodiments, the bone conduction sensor 180M may be alternatively disposed in an earphone, to obtain a bone conduction earphone. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power-on button, a volume button, and the like. The button 190 may be a mechanical button, or may be a touch key. The electronic device 100 may receive button input, and generate button signal input related to a user setting and function control of the electronic device 100.

The motor 191 may generate a vibration prompt. The motor 191 may be configured to provide a vibration prompt for an incoming call, and may be further configured to provide a touch vibration feedback. For example, touch operations performed on different applications (for example, photographing and audio playing) may correspond to different vibration feedback effects. For touch operations performed on different regions of the display screen 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, may be configured to indicate a charging state and a battery change, and may be further configured to indicate a message, a missed call, a notification, and the like.

The SIM card interface 195 is configured to connect to a SIM card. The SIM card may be inserted into the SIM card interface 195 or detached from the SIM card interface 195, to be in contact with or detached from the electronic device 100. The electronic device 100 may support one or N SIM card interfaces, where N is a positive integer greater than 1. The SIM card interface 195 may support a nano-SIM card, a micro-card, a SIM card, and the like. A plurality of cards may be inserted into the same SIM card interface 195 at the same time. The plurality of cards may be of the same type or different types. The SIM card interface 195 may be alternatively compatible with different types of SIM cards. The SIM card interface 195 may be also compatible with an external storage card. The electronic device 100 interacts with a network by using a SIM card, to implement functions such as conversation and data communication. In some embodiments, the electronic device 100 uses an eSIM, namely, an embedded SIM card. The eSIM card may be embedded into the electronic device 100, and cannot be detached from the electronic device 100.

The following describes some example user interfaces (UI) provided by the electronic device 100. The term "user interface" in this specification, the claims, and the accompanying drawings of this application is a medium interface for interaction and information exchange between an application or an operating system and a user. The term implements conversion between an internal form of information and an acceptable form of the user. An expression form commonly used in the user interface is the graphical user interface (GUI) that indicates a user interface that is displayed in a graphical manner and that is related to a computer operation. The user interface may be an interface element such as an icon, a window, or a control that is displayed on a display screen of an electronic device. The control may include a visible interface element such as an icon, a key, a menu, a tab, a text box, a dialog box, a status bar, a navigation bar, and a widget.

Figure 2A:
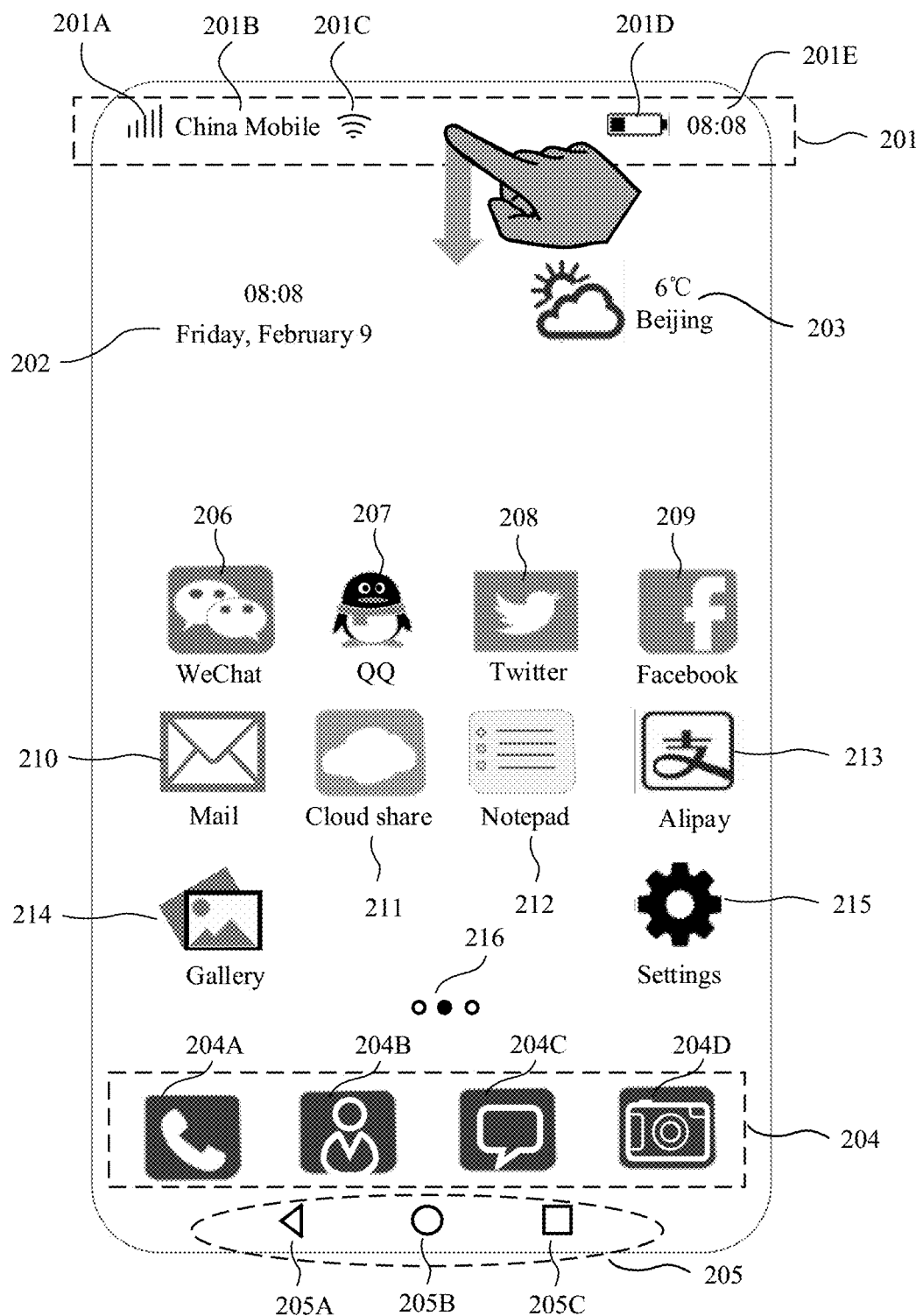
FIG. 2A and FIG. 2B are schematic diagrams of a manner of enabling "FOV expansion" according to an embodiment of this application.

FIG. 2A illustrates an example user interface 21 that is on an electronic device 100 and that is used for displaying an application installed on the electronic device 100.

The user interface 21 may include a status bar 201, a calendar indicator 202, a weather indicator 203, a tray 204 with an icon of a common application, a navigation bar 205, and an icon of another application.

The status bar 201 may include one or more signal strength indicators 201A of a mobile communication signal (also referred to as a cellular signal), an operator name (for example, "China Mobile") 201B, one or more signal strength indicators 201C of a wireless fidelity (Wi-Fi) signal, a battery status indicator 201D, and a time indicator 201E.

The calendar indicator 202 may be used to indicate current time, for example, a date, a day of the week, and hour/minute information.

The weather indicator 203 may be used to indicate a weather type, for example, a cloudy to sunny or light rain; and may be further used to indicate information such as a temperature.

The tray 204 with the icon of the common application may be displayed as a Phone icon 204A, a Contacts icon 204B, an SMS icon 204C, and a Camera icon 204D.

The navigation bar 205 may include system navigation keys such as a return key 205A, a home screen key 205B, and a multi-task key 205C. When it is detected that a user taps the return key 205A, the electronic device 100 may display a previous page of a current page. When it is detected that the user taps the home screen key 205B, the electronic device 100 may display a home screen. When it is detected that the user taps the multi-task key 205C, the electronic device 100 may display a task recently enabled by the user. The navigation keys may have other names. This is not limited in this application. This is not limited to a virtual key. Each navigation key in the navigation bar 205 may also be implemented as a physical key.

The icon of the another application may be, for example, a WeChat icon 206, a QQ icon 207, a Twitter icon 208, a Facebook icon 209, a Mail icon 210, a Cloud share icon 211, a Notepad icon 212, an Alipay icon 213, a Gallery icon 214, and a Settings icon 215. The user interface 21 may further include a page indicator 216. Other application icons may be distributed on a plurality of pages. The page indicator 216 may be used to indicate a specific page on which an application that the user currently browses is located. The user may slide in a region of other application icons, to browse an application icon on another page.

In some embodiments, the user interface 21 shown in an example in FIG. 2A may be a home screen.

In some other embodiments, the electronic device 100 may further include a physical home screen button. The home screen button may be configured to: receive an instruction of the user, and return to the home screen from a currently displayed UI, so that the user can conveniently view the home screen at any time. The instruction may be specifically an operation instruction that the user presses the home screen button once, an operation instruction that the user presses the home screen button twice consecutively in a short time, or an operation instruction that the user presses and holds the home screen button in a predetermined time. In some other embodiments of this application, the home screen button may further be integrated with a fingerprint sensor, to collect and recognize a fingerprint at the same time when the home screen button is pressed.

It may be understood that FIG. 2A shows merely an example of a user interface on the electronic device 100. This shall not constitute limitation on this embodiment of this application.

The following describes several manners of enabling a "FOV expansion" function on the electronic device 100 according to an embodiment of this application.

Figure 2B:
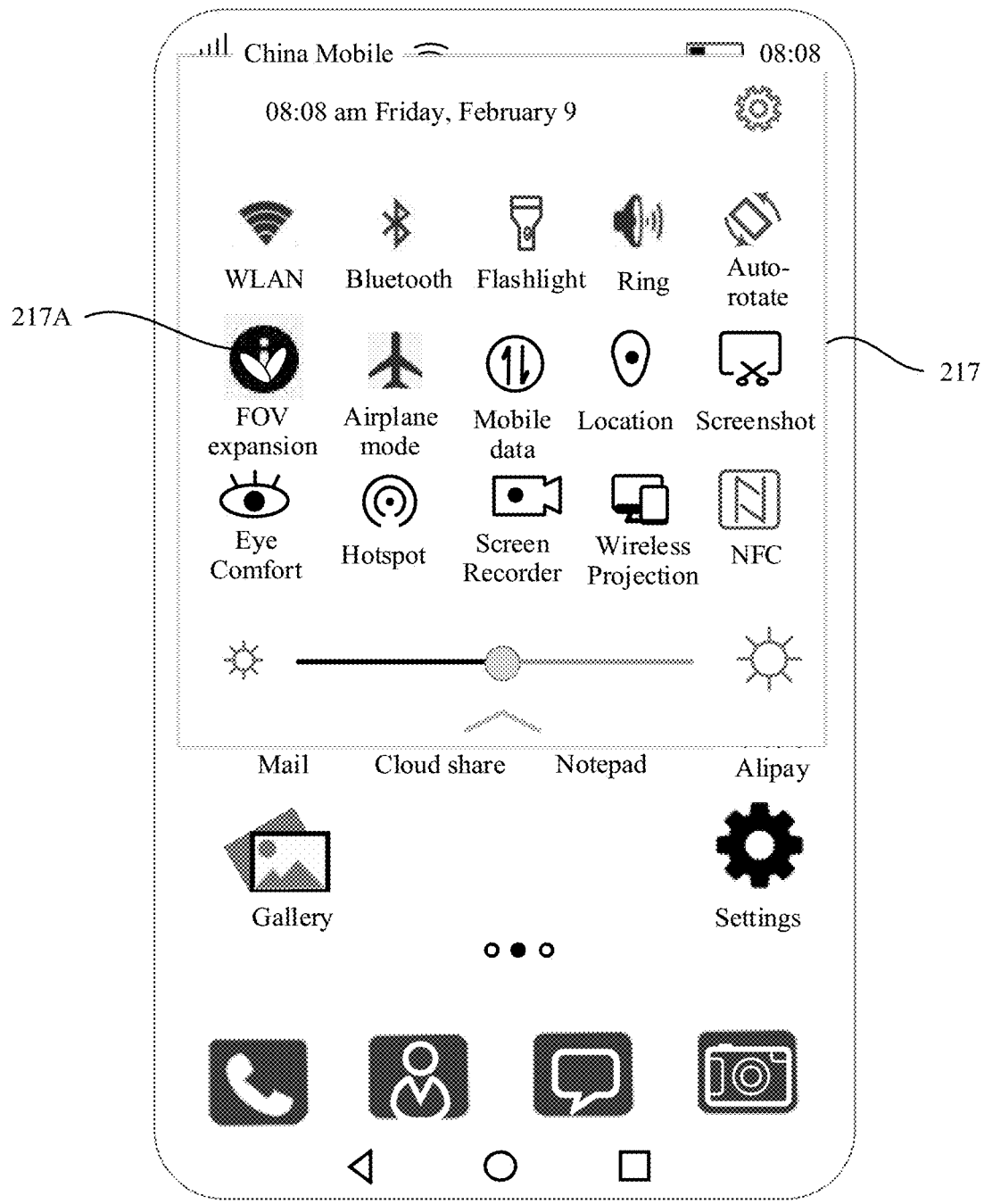

FIG. 2A and FIG. 2B illustrate an example of an operation of enabling the "FOV expansion" function on the electronic device 100.

As shown in FIG. 2A, when the electronic device detects a downward sliding gesture on the status bar 201, the electronic device 100 may display a window 217 on the user interface 21 in response to this gesture. As shown in FIG. 2B, the window 217 may display a "FOV expansion" switch control 217A, and may further display a switch control of another function (for example, Wi-Fi, Bluetooth, or Flashlight). When an operation (for example, a touch operation on the switch control 217A) on the switch control 217A in the window 217 is detected, the electronic device 100 may enable the "FOV expansion" function in response to this operation.

In other words, the user may make the downward sliding gesture at the status bar 201 to open the window 217, and tap the "FOV expansion" switch control 217A in the window 217 to conveniently enable the "FOV expansion". An expression form of the "FOV expansion" switch control 217A may be text information or an icon.

In this embodiment of this application, after the "FOV expansion" is enabled by using the operations shown in FIG. 2A and FIG. 2B, a part of or all of instant messaging software installed on the electronic device 100 has permission to use the "FOV expansion" function of the electronic device 100. This part of instant messaging software may be set by default by the electronic device 100, or may be independently set by the user. This is not limited in this embodiment of this application.

Figure 3A:
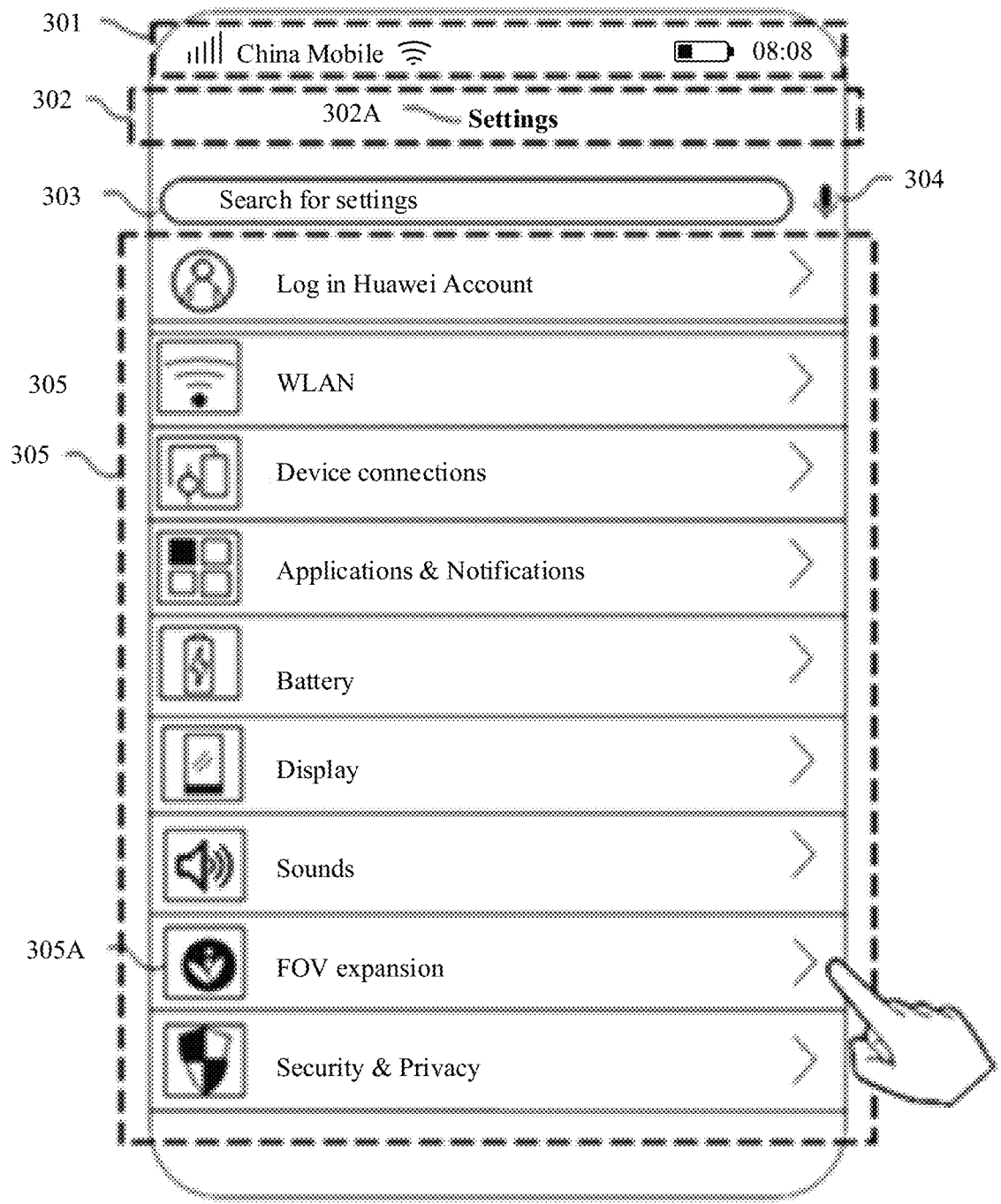
FIG. 3A to FIG. 3C are schematic diagrams of another manner of enabling "FOV expansion" according to an embodiment of this application.
Figure 3B:
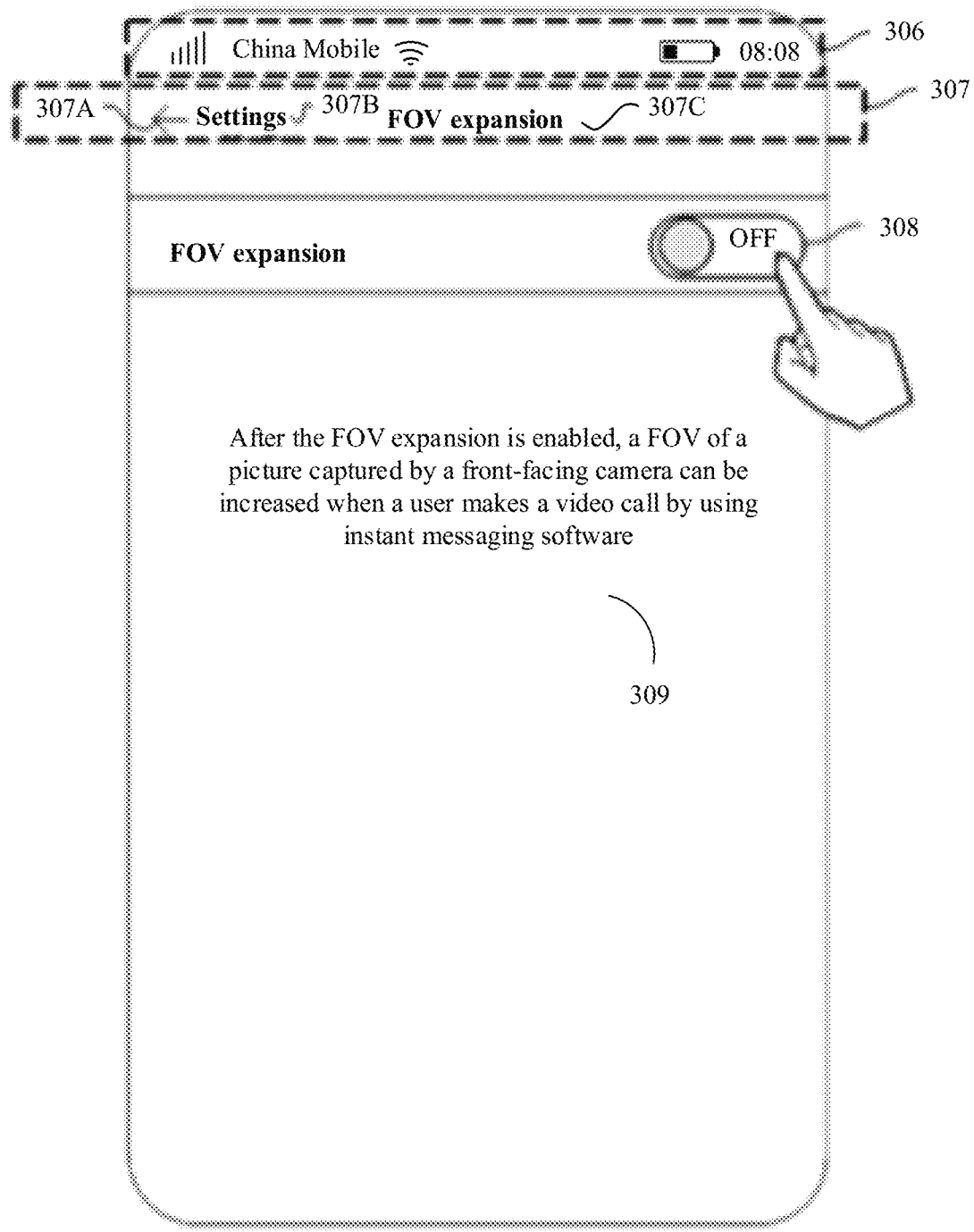
Figure 3C:
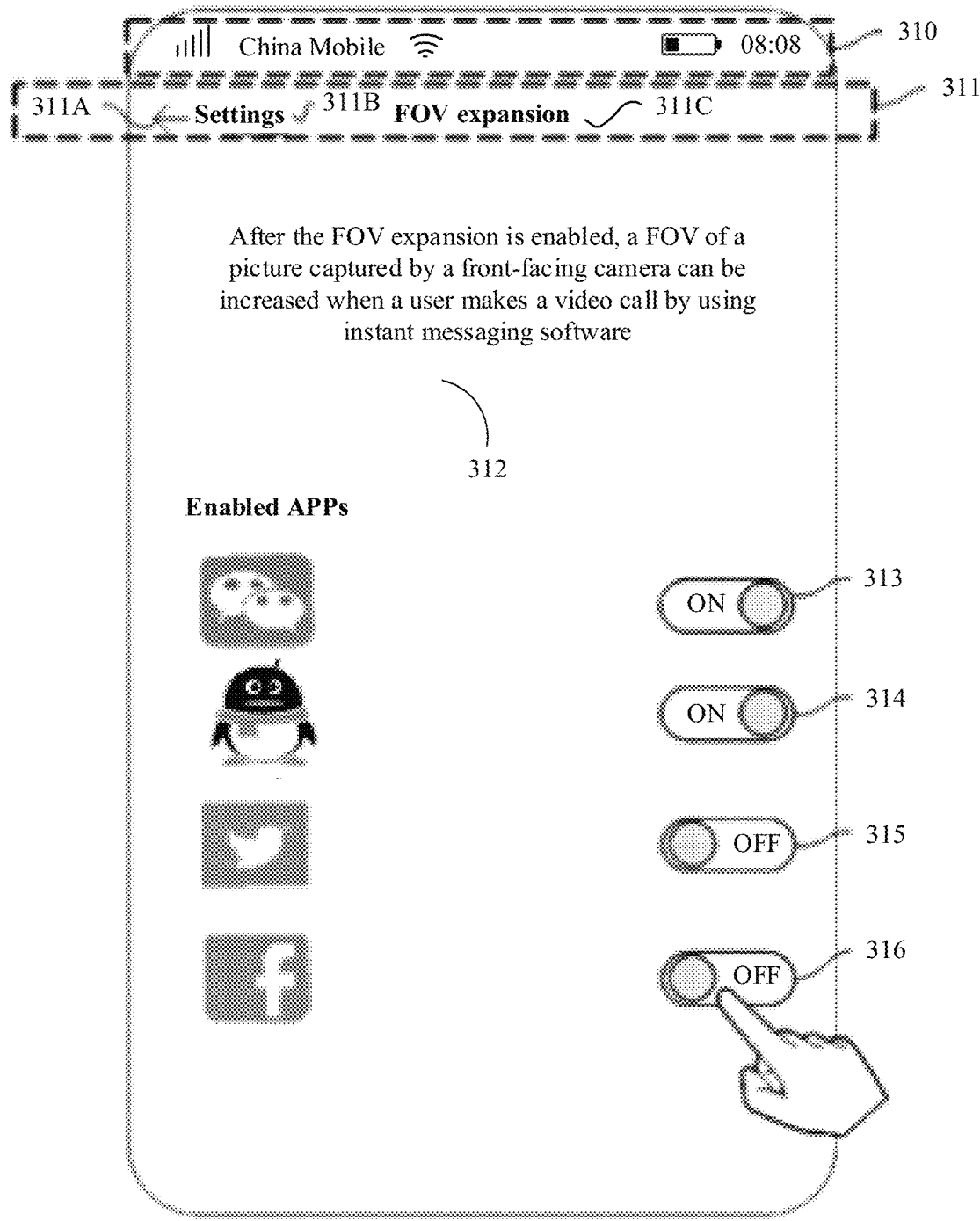

FIG. 3A to FIG. 3C illustrate examples of other two operations of enabling the "FOV expansion" function on the electronic device 100.

An example user interface 31 shown in FIG. 3A may be an implementation of a "Settings" interface. The user interface 31 may be provided by a "Settings" application. The "Settings" application is an application that is installed on an electronic device such as a smartphone or a tablet computer and that is used to set various functions of the electronic device 100. A name of the application is not limited in this embodiment of this application. The user interface 31 may be a user interface that is opened by the user through tapping the Settings icon 215 in the user interface 21 shown in FIG. 2A.

As shown in FIG. 3A, the user interface 31 may include a status bar 301, a title bar 302, a search box 303, an icon 304, and a region 305 including one or more setting items.

For the status bar 301, refer to the status bar 201 in the user interface 21 shown in FIG. 2A. Details are not described herein again.

The title bar 302 may include a current page indicator 302A. The current page indicator 302A may be used to indicate a current page. For example, text information "Settings" may be used to indicate that the current page is used to display one or more setting items. This is not limited to text information. The current page indicator 302A may alternatively be an icon.

The search box 303 may be used to monitor an operation (for example, a touch operation) of searching for a setting item through a text. In response to this operation, the electronic device 100 may display a text input box, so that the setting item for which the user wants to search is displayed in the input box.

The icon 304 may be used to monitor an operation (for example, a touch operation) of searching for a setting item through a voice. In response to this operation, the electronic device 100 may display a voice input interface, so that the user inputs a voice in the voice input interface to search for the setting item.

The region 305 includes one or more setting items. The one or more setting items may include: a Log in Huawei account setting item, a WLAN setting item, a Device connections setting item, an Applications & Notifications setting item, a Battery setting item, a Display setting item, a Sounds setting item, a FOV expansion setting item 305A, a Security & Privacy setting item, a Users & Accounts setting item, and the like. An expression form of each setting item may include an icon and/or a text. This is not limited in this application. Each setting item may be used to monitor an operation (for example, a touch operation) of triggering display of setting content corresponding to the setting item. In response to this operation, the electronic device 100 may open a user interface used to display the setting content corresponding to the setting item.

In some embodiments, when it is detected that an operation (for example, a touch operation) is performed on the FOV expansion setting item 305A in the user interface 31 shown in FIG. 3A, the electronic device may display a user interface 32 shown in FIG. 3B.

As shown in FIG. 3B, the user interface 32 is used to display content corresponding to the FOV expansion setting item. The user interface 32 may include a status bar 306, a title bar 307, a "FOV expansion" switch control 308, and prompt information 309.

For the status bar 306, refer to the status bar 201 in the user interface 21 shown in FIG. 2A. Details are not described herein again.

The title bar 307 may include a return key 307A, and current page indicators 307B and 307C. The return key 307A is an APP-level return key, and can be used to return to an upper-level menu. An upper-level page of the user interface 32 may be the user interface 31 shown in FIG. 3A. The current page indicators 307B and 307C may be used to indicate a current page. For example, the text information "Settings" and "FOV expansion" may be used to indicate that the current page is used to display corresponding content of the "FOV expansion" setting item. The current page indicators are not limited to the text information. The current page indicators 307B and 307C may also be icons.

The switch control 308 is used to monitor an operation (for example, a touch operation) of enabling/disabling the "FOV expansion". As shown in FIG. 3B, when an operation on the switch control 308 (for example, a touch operation on the switch control 308) is detected, the electronic device 100 may enable the "FOV expansion" function in response to this operation. An expression form of the switch control 308 may be text information or an icon.

The prompt information 309 may be used to describe the "FOV expansion" function, to indicate the "FOV expansion" function to the user. An expression form of the prompt information 309 may be text information or an icon.

In this embodiment of this application, after the "FOV expansion" is enabled by using the operation shown in FIG. 3B, a part of or all of instant messaging software installed on the electronic device 100 has permission to use the "FOV expansion" function of the electronic device 100. This is the same as the foregoing process of enabling the "FOV expansion" by using the operations shown in FIG. 2A and FIG. 2B. This part of instant messaging software may be set by default by the electronic device 100, or may be independently set by the user. This is not limited in this embodiment of this application.

In some other embodiments, when it is detected that an operation (for example, a touch operation) is performed on the FOV expansion setting item 305A in the user interface 31 shown in FIG. 3A, the electronic device 100 may display a user interface 33 shown in FIG. 3C.

As shown in FIG. 3C, the user interface 33 is used to display content corresponding to the FOV expansion setting item. The user interface 33 may include a status bar 310, a title bar 311, prompt information 312, "FOV expansion" switch controls 313 to 316 respectively corresponding to one or more pieces of instant messaging software.

For the status bar 310, refer to the status bar 201 in the user interface 21 shown in FIG. 2A. Details are not described herein again.

The title bar 311 may include a return key 311A, and current page indicators 311B and 311C. The return key 311A is an APP-level return key, and can be used to return to an upper-level menu. An upper-level page of the user interface 33 may be the user interface 31 shown in FIG. 3A. The current page indicators 311B and 311C may be used to indicate a current page. For example, the text information "Settings" and "FOV expansion" may be used to indicate that the current page is used to display corresponding content of the "FOV expansion" setting item. The current page indicators are not limited to the text information. The current page indicators 311B and 311C may also be icons.

For the prompt information 312, refer to the prompt information 309 in the user interface 32 shown in FIG. 3B. Details are not described herein again.

The "FOV expansion" switch controls 313 to 316 respectively corresponding to the one or more pieces of instant messaging software may be used to monitor an operation (for example, a touch operation) of enabling/disabling the "FOV expansion". The one or more pieces of instant messaging software may be all instant messaging software installed on the electronic device 100. As shown in FIG. 3C, when an operation on the switch controls 313 to 316 (for example, a touch operation on the switch controls 313 to 316) is detected, the electronic device 100 may enable/disable permission of the corresponding instant messaging software to use the "FOV expansion" function of the electronic device 100 in response to this operation. For example, as shown in FIG. 3C, when an operation on the switch control 313 is detected, the electronic device 100 may allow instant messaging software WeChat to use the "FOV expansion" function of the electronic device 100. Expression forms of the switch controls 313 to 316 may be text information or icons.

This is not limited to the foregoing several manners of enabling the "FOV expansion" function shown in FIG. 2A and FIG. 2B, and FIG. 3A to FIG. 3C. In some embodiments, the "FOV expansion" function may be further enabled in another manner. In some other embodiments, the electronic device 100 may also enable the "FOV expansion" function by default, for example, automatically enable the "FOV expansion" function after the electronic device 100 is powered on.

In some embodiments of this application, after enabling the "FOV expansion" function, the electronic device 100 may further display, in the status bar 201, prompt information indicating that the "FOV expansion" is enabled. For example, the status bar 201 displays the "Expansion of the FOV" icon, or directly displays the text "Expansion of the FOV".

Figure 4A:
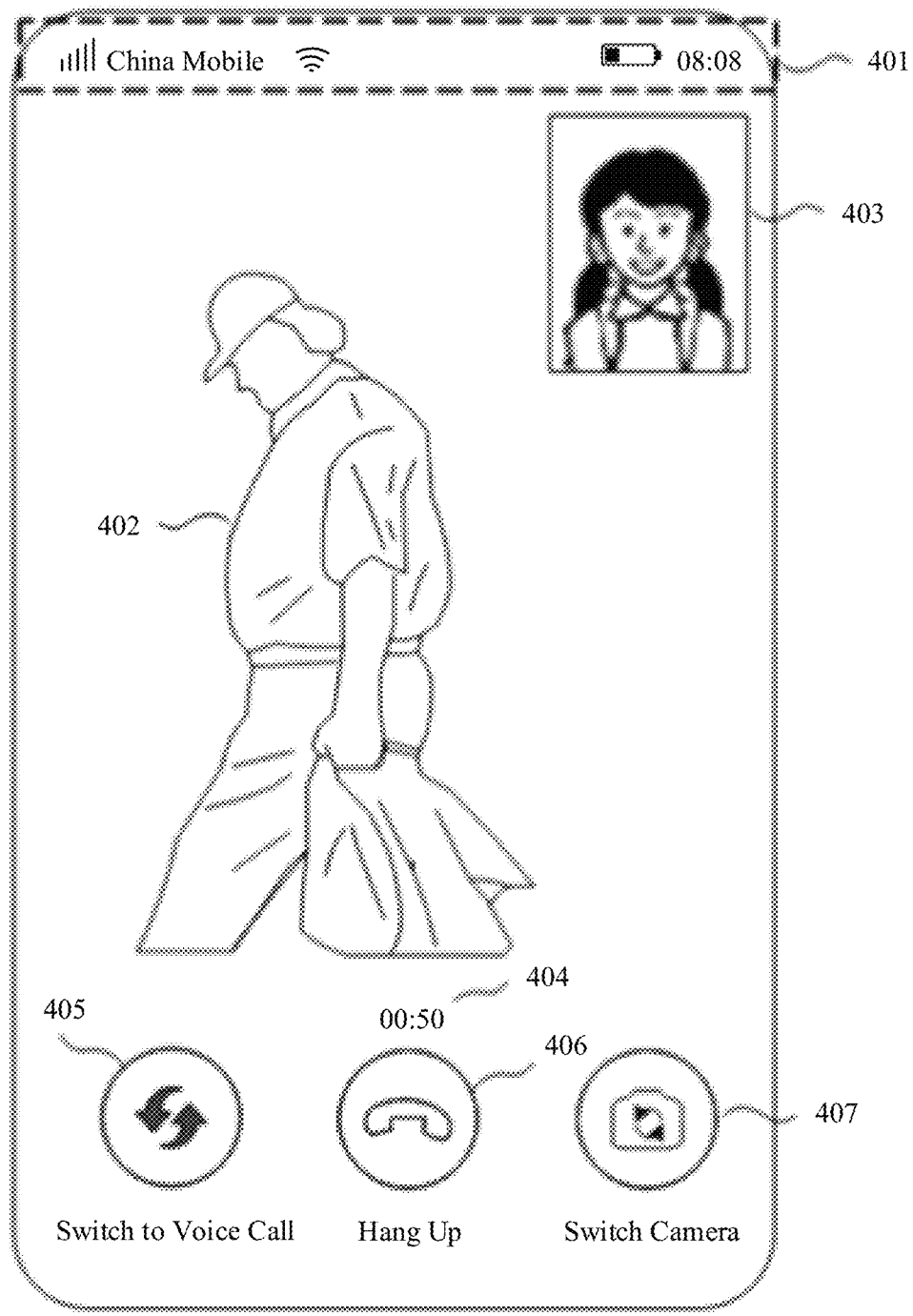
FIG. 4A to FIG. 4C are schematic diagrams of human-computer interaction in a video call scenario according to an embodiment of this application.
Figure 4B:
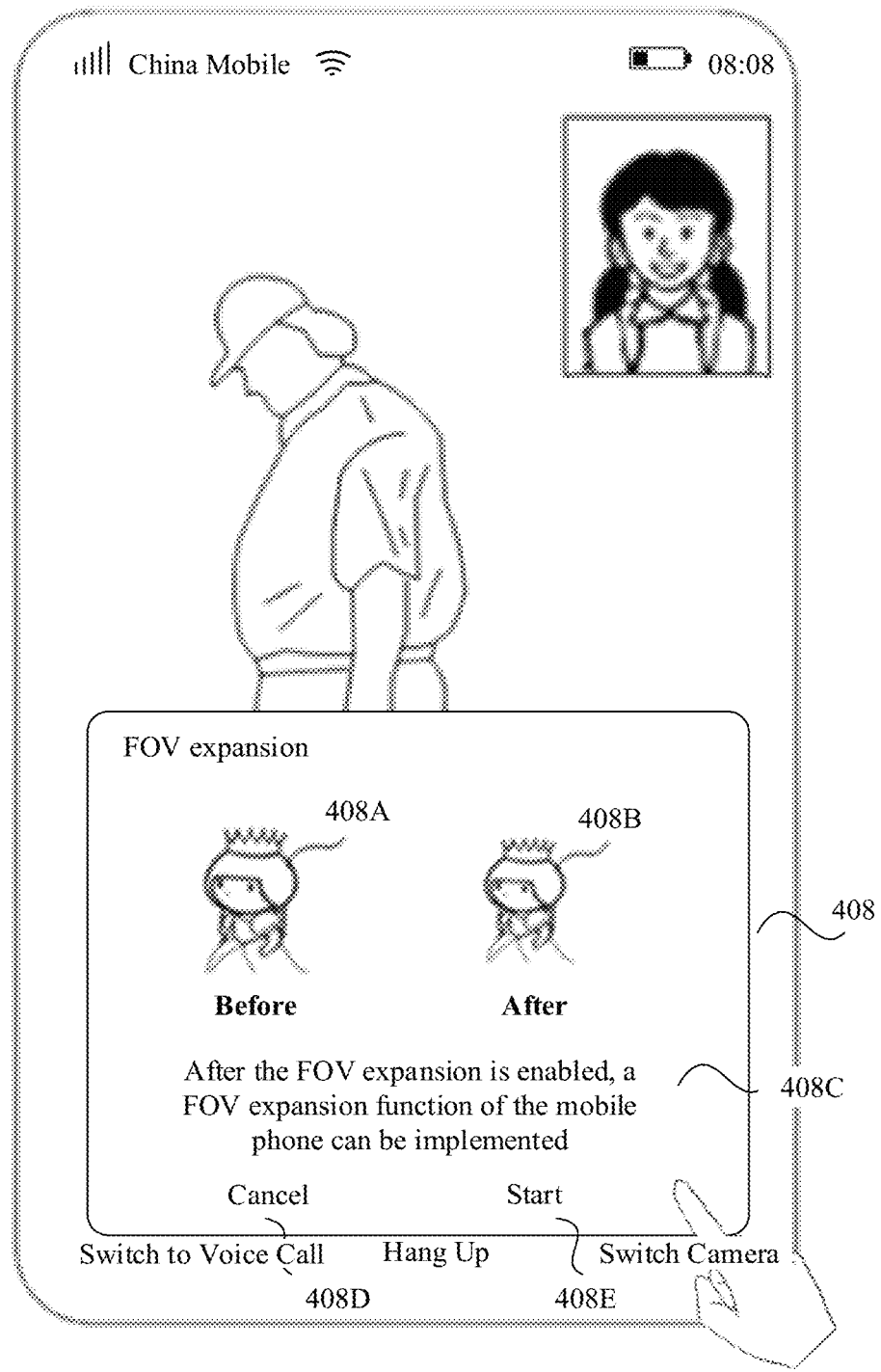
Figure 4C:
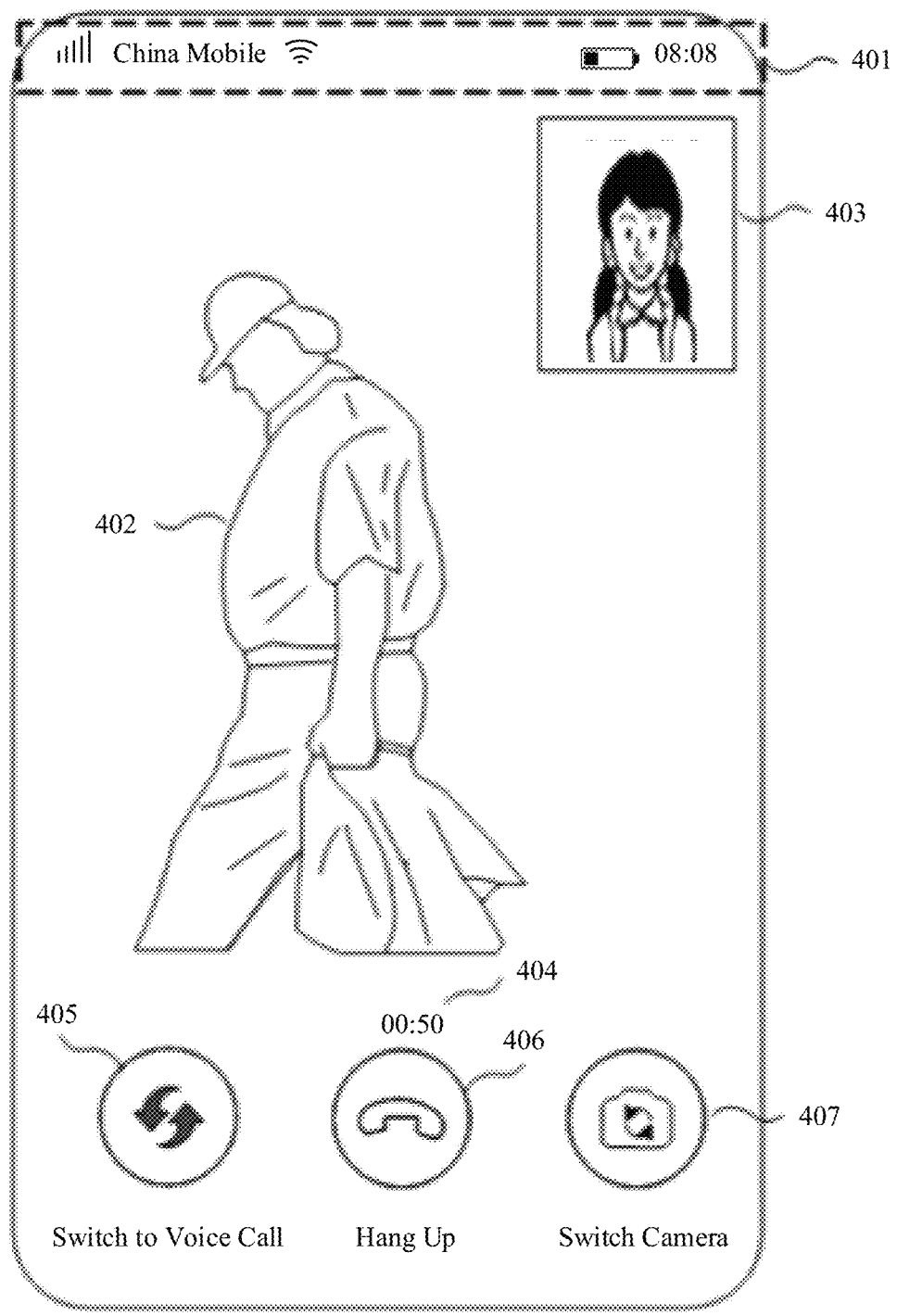

With reference to a video call scenario, the following describes a process in which a user makes a video call by using instant messaging software. As shown in FIG. 4A to FIG. 4C, in some embodiments, a "video call screen" may be used to display pictures of both parties in a video call and a related control in one or more video calls. A picture of one party in the video call (that is, a picture of a local user on an electronic device) may be a picture collected by the camera 193 of the electronic device 100. The camera may be a front-facing camera, or may be a rear-facing camera. A picture of the other party in the video call (that is, a picture of a peer user) may be a picture that is sent by another electronic device 100 and that is received by the electronic device 100 by using an instant messaging software program providing the "video call screen". The related control in the video call may be used to receive an operation (for example, a touch operation) of the user. In response to the operation of the user, the electronic device 100 may perform one or more of the following: switching from a video call to a voice call, hanging up the video call, switching a camera, or the like.

An example user interface 41 shown in FIG. 4A to FIG. 4C may be an implementation of a "video call screen". The user interface 41 may be provided by, for example, WeChat. In some embodiments, the user interface 41 may be a user interface that is opened after the user taps the WeChat icon 206 in FIG. 2A and selects a contact to initiate a video call. In some other embodiments, the user interface 41 may further be a user interface that is opened after the user taps the WeChat icon 206 in FIG. 2A and accepts a video call initiated by a contact. In some other embodiments, the user interface 41 may further be a user interface invoked by the user through a voice.

As shown in FIG. 4A to FIG. 4C, the user interface 41 may include a status bar 401, a display region 402 for the picture of the peer user, a display region 403 for the picture of the local user, a call duration indicator 404, a control 405, a control 406, and a control 407. In some embodiments, the user interface 41 may further include a navigation bar that can be hidden (not shown in the figure). For the navigation bar, refer to the navigation bar 205 in FIG. 2A.

For the status bar 401, refer to the status bar 201 in the user interface 21 shown in FIG. 2A. Details are not described herein again.

The display region 402 for the picture of the peer user is used to display the picture of the peer user in the video call. The picture of the peer user is a picture that is sent by the another electronic device 100 and that is received by the electronic device 100 by using the instant messaging software providing the user interface 41.

The display region 403 for the picture of the local user is used to display the picture of the local user in the video call. The picture of the local user is a picture collected by the camera 193 of the electronic device 100. The camera may be a front-facing camera or a rear-facing camera. In this implementation of this application, the picture of the local user is a picture collected by the front-facing camera of the electronic device 100.

The call duration indicator 404 is used to indicate duration of a video call. The call duration indicator 404 may be text information "00:50" for indicating that duration of the current video call is 50 seconds.

The control 405 is used to monitor an operation of switching a video call to a voice call. In response to a detected operation (for example, a touch operation) performed on the control 405, the electronic device 100 may switch the current video call between the local user and the peer user to the voice call.

The control 406 is used to monitor an operation of hanging up a video call. In response to a detected operation (for example, a touch operation) performed on the control 406, the electronic device 100 may hang up the current video call between the local user and the peer user.

The control 407 is used to monitor an operation of switching a camera. In response to a detected operation (for example, a touch operation) performed on the control 407, the electronic device 100 may switch a currently enabled camera, for example, switch the front-facing camera to the rear-facing camera, or switch the rear-facing camera to the front-facing camera.

Expression forms of the control 405, the control 406, and the control 407 may be icons and/or text information.

In some embodiments, when the "FOV expansion" function is not enabled, that is, when the instant messaging software currently started in the electronic device 100 does not have permission to use the "FOV expansion" function of the electronic device 100, the electronic device 100 displays the interface shown in FIG. 4B, that is, further displays a prompt window 408 on the currently displayed interface. The prompt window 408 includes: effect display information 408A before the "FOV expansion" is enabled, effect display information 408B after the "FOV expansion" is enabled, prompt information 408C, a control 408D, and a control 408E.

The effect display information 408A and the effect display information 408B can present different effects before and after the "FOV expansion" is enabled, so that the user intuitively experiences the "FOV expansion" function. Expression forms of the effect display information 408A and the effect display information 408B may be pictures and/or texts.

The prompt information 408C is used to describe a function and an enabling manner of the "FOV expansion". An expression form of the prompt information 408C may be a text, for example, the text shown in FIG. 4B.

The control 408D may be used to monitor an operation of stopping displaying the prompt window 408. The electronic device 100 may stop displaying the prompt window 408 in response to a detected operation (for example, a touch operation) performed on the control 408D. An expression form of the control 408D may be an icon or a text (for example, a text "Cancel" in FIG. 4B).

The control 408E may be used to monitor an operation of stopping displaying the prompt window 408, to present an effect obtained after the "FOV expansion" function provided by the electronic device 100 is implemented. In response to a detected operation (for example, a touch operation) performed on the control 408E, the electronic device 100 may stop displaying the prompt window 408, and present a picture effect that is displayed (with reference to FIG. 4C) in the display region 403 of the picture of the local user and that is obtained after the "FOV expansion" function currently provided by the electronic device 100 is implemented. An expression form of the control 408D may be an icon or a text (for example, a text "Start" in FIG. 4B). In this embodiment of this application, with reference to FIG. 4C, in response to a detected operation performed on the control 408E, a field of view of the picture displayed in the display region 403 for the picture of the local user changes.

When the "FOV expansion" function is enabled, that is, when the instant messaging software currently enabled by the electronic device 100 has permission to use the "FOV expansion" function of the electronic device, the UI interface shown in FIG. 4C is directly displayed after the instant messaging software is started.

Figure 5A:
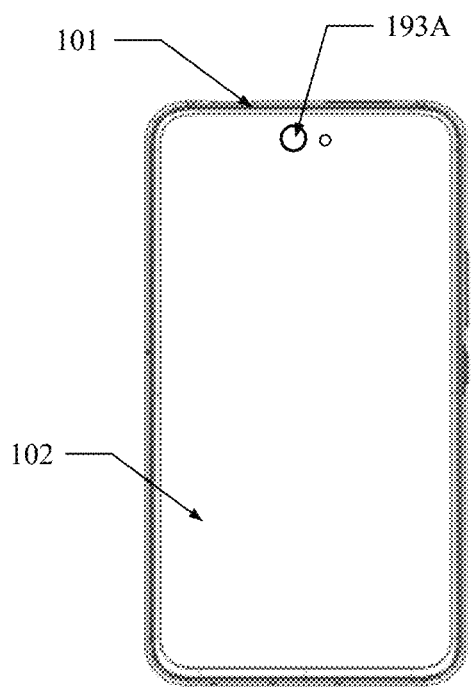
FIG. 5A is a schematic front plan view of an electronic device according to an embodiment of this application.
Figure 5B:
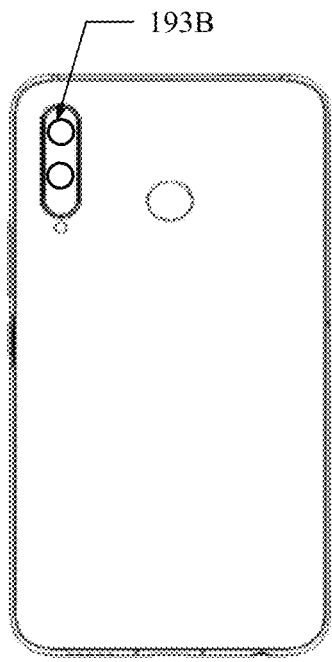
FIG. 5B is a schematic back plan view of an electronic device according to an embodiment of this application.

The following describes some embodiments of a hardware apparatus used in an embodiment of this application to implement the "FOV expansion" function. With reference to FIG. 5A, the electronic device 100 further includes a rear cover 101 and a display screen 102 mounted on the rear cover 101. A display surface of the display screen 102 is a front region of the electronic device 100. Still with reference to FIG. 5B, the front-facing camera 193A is disposed on a side of the display screen 102, and the rear-facing camera 193B is disposed on a side of the rear cover 101, so that the front-facing camera 193A and the rear-facing camera 193B are disposed opposite to each other. In this way, the front-facing camera 193A and the rear-facing camera 193B may take pictures in two opposite directions. In this embodiment of this application, one front-facing camera 193A and one rear-facing camera 193B are disposed in the electronic device 100. In another implementation, there may be two or more front-facing cameras 193A and rear-facing cameras 193B. This is not limited herein.

In addition, the electronic device 100 further includes a light reflective apparatus connected to the rear cover 101. The light reflective apparatus may be switched between a usage state and an idle state. When the light reflective apparatus is in the usage state, the light reflective apparatus is located on an object-facing side of the rear-facing camera 193B and is configured to reflect a picture in a direction in which the front-facing camera 193A is located, so that the rear-facing camera 193B captures the picture in the light reflective apparatus. The object-facing side indicates a side on which the rear-facing camera 193B faces a photographed object. The processor 110 is configured to: process the picture captured by the rear-facing camera 193B, fuse the processed picture and a picture captured by the front-facing camera 193A, and display a composite picture, to increase a field of view of the picture captured by the front-facing camera 193A. When the light reflective apparatus is in the idle state, the rear-facing camera 193B may capture a picture in the direction in which the rear-facing camera 193B is located.

The electronic device 100 in this embodiment of this application includes the light reflective apparatus that is configured to reflect the picture in the direction in which the front-facing camera is located, so that the rear-facing camera 193B can capture the picture reflected by the light reflective apparatus. In this way, the field of view of the picture taken by the front-facing camera 193A can be expanded by fusing the picture taken by the rear-facing camera and the picture taken by the front-facing camera, to improve visual experience of a user when the user makes a video call by using the electronic device 100.

Figure 6A:
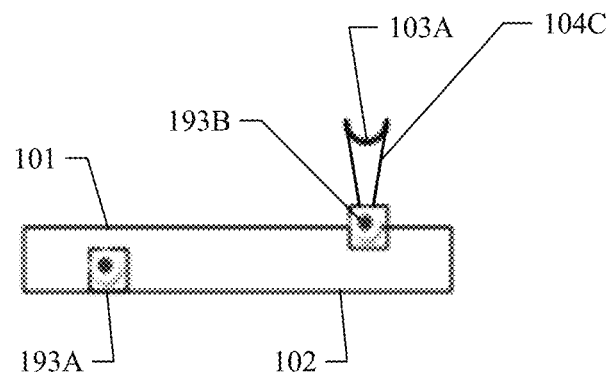
FIG. 6A is a schematic diagram of a light reflective apparatus in a usage state according to a first embodiment of this application.
Figure 6B:
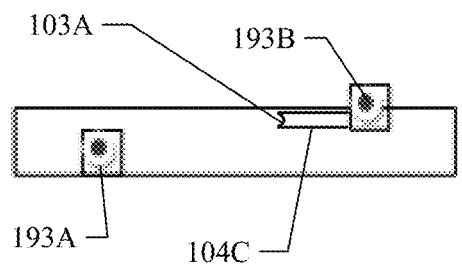
FIG. 6B is a schematic diagram of a light reflective apparatus in an idle state according to a first embodiment of this application.
Figure 6C:
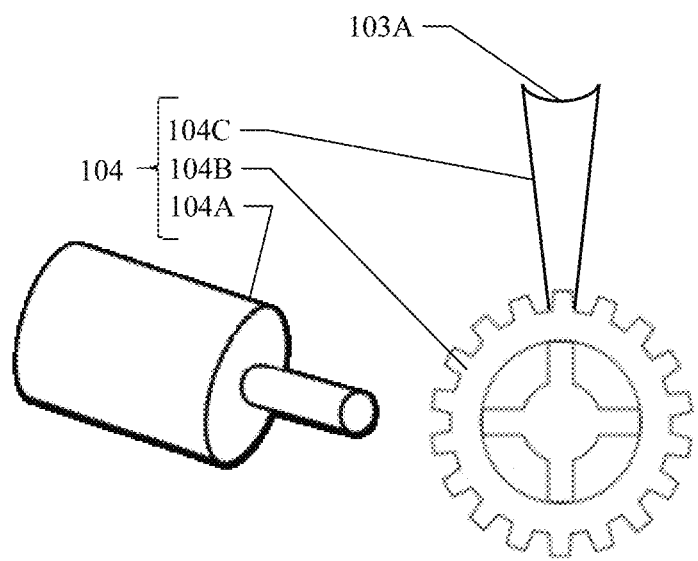
FIG. 6C is a schematic diagram of a drive component configured to drive a light reflective apparatus according to a first embodiment of this application.

With reference to FIG. 6A to FIG. 6C, in a first implementation of this application, a light reflective apparatus 103A is a light reflective film made of a flexible material. The electronic device 100 further includes a drive component 104 disposed in the rear cover 101. As shown in FIG. 6C, the drive component 104 includes a drive part 104A, a convey part 104B, and a fastener 104C. One end of the convey part 104B is mounted on the drive part 104A, and the other end is connected to the fastener 104C. The light reflective apparatus 103A is disposed at an end that is of the fastener 104C and that is away from the convey part 104B. When the drive part 104A drives the convey part 104B to rotate, the convey part 104B may drive the fastener 104C to move and further drive the light reflective apparatus 103A to move, so that the light reflective apparatus 103A is switched between the usage state (as shown in FIG. 6A) and the idle state (as shown in FIG. 6B). In this implementation, the drive part 104A is electrically connected to the processor 110, and receives control of the processor 110 to drive the convey part 104B to rotate.

For example, when the drive part 104A drives the convey part 104B to rotate counterclockwise, the fastener 104C drives the light reflective apparatus 103A to switch from the usage state to the idle state. When the drive part 104A drives the convey part 104B to rotate clockwise, the fastener 104C drives the light reflective apparatus 103A to switch from the idle state to the usage state. Because the light reflective apparatus 103A is made of a flexible material, a shape of the light reflective apparatus 103A is not fixed in a process of switching between the usage state and the idle state. In the usage state, the light reflective apparatus 103A is in a specific shape. For example, the light reflective apparatus 103A may be in a convex lens shape shown in FIG. 6A, or may be in another specific shape. This is not limited herein.

In this implementation, the drive part 104A may be a step motor, the convey part 104B may be a gear, and the fastener 104C may be a lever. During mounting, a spindle of the motor can be inserted into and fixedly connected to a center hole of the gear. It may be understood that types and composition of structure components in the drive component 104 are not limited, provided that the light reflective apparatus 103A can be driven to switch between the usage state and the idle state.

It should be noted that, in this implementation, when the light reflective apparatus 103A is in the usage state, the light reflective apparatus 103A is located in front of the rear-facing camera 193B. In this case, the rear-facing camera 193 can capture only the picture in the reflective apparatus 103A. When the light reflective apparatus 103A is in the idle state, the light reflective apparatus 103A is away from the object-facing side of the rear-facing camera 193B. In other words, in this case, the light reflective apparatus 103A does not block sight of the rear-facing camera 193B. In this case, the rear-facing camera 193B can be normally used, to capture the picture in the direction in which the rear-facing camera 193B is located. In this implementation, the light reflective apparatus 103 has a light weight because the light reflective apparatus 103 is the light reflective film made of the flexible material. Therefore, the light reflective apparatus 103 can be driven by relatively small driving force, and can implement approximately full light reflection.

Figure 7A:
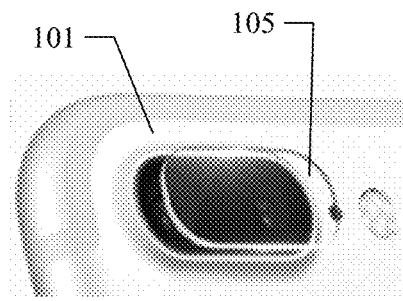
FIG. 7A to FIG. 7C are schematic diagrams of a relationship between a light reflective apparatus and a lens protection cover according to an embodiment of this application.
Figure 7B:
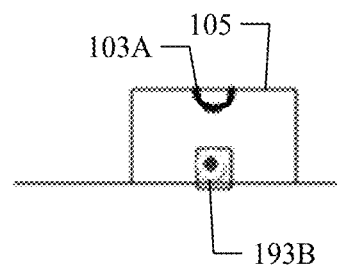
Figure 7C:
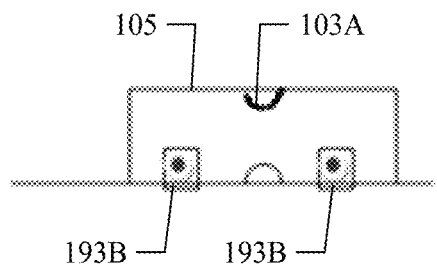

With reference to FIG. 7A to FIG. 7C, in some implementations, the electronic device 100 further includes a lens protection cover 105. The lens protection cover 105 is detachably mounted on the rear cover 101 and is in a position facing the rear-facing camera 193B. The lens protection cover 105 is configured to protect the rear-facing camera 193B, to prevent the rear-facing camera 193B from being scratched. When the light reflective apparatus 103A is in the usage state, the light reflective apparatus 103A is fitted to an inner wall of the lens protection cover 105. The inner wall of the lens protection cover 105 indicates a surface that is of the lens protection cover 105 and that faces the rear-facing camera 193B. When the electronic device 100 includes only one rear-facing camera 193B, a light reflective apparatus 103B faces the rear-facing camera 193B (with reference to FIG. 7B). When the electronic device 100 includes two rear-facing cameras 193B, the light reflective apparatus 103B is located on a perpendicular bisector of the two rear-facing cameras 193B (with reference to FIG. 7C).

Figure 8A:
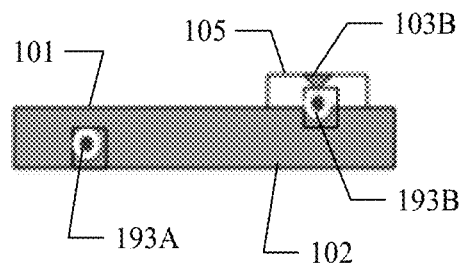
FIG. 8A and FIG. 8B are schematic diagrams of a light reflective apparatus according to a second embodiment of this application.
Figure 8B:
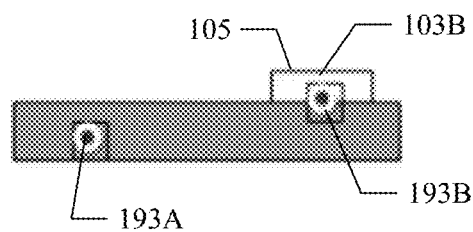

With reference to FIG. 8A and FIG. 8B, in a second implementation of this application, the light reflective apparatus 103B is a light reflective layer that may be coated on a carrier (for example, the lens protection cover 105) to form a specific shape, for example, a triangular shape, a convex lens shape, or another shape. This is not limited herein. When the light reflective apparatus 103B is in the usage state, the light reflective apparatus 103B is in a translucent mode when being powered on (with reference to FIG. 8A). In this case, the rear-facing camera 193B can capture the picture in the light reflective apparatus 103B. When the light reflective apparatus 103B is in the idle state, the light reflective apparatus 103B is in a transparent mode when being powered off (with reference to FIG. 8B). In this case, the rear-facing camera 193B can capture the picture in the direction in which the rear-facing camera 193B is located. In this implementation, the light reflective layer is made of an electroluminescent material. In this implementation, because a position of the light reflective layer is fixed, mechanical transmission is not required. In this way, precision is relatively high, and a requirement for a process is relatively low. This is relatively easy to implement.

Figure 9A:
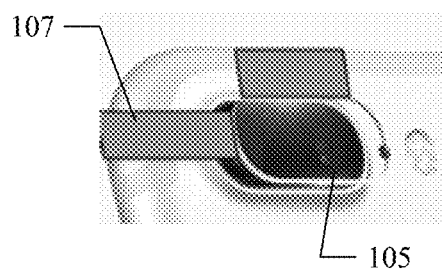
FIG. 9A to FIG. 9C are schematic diagrams of a light reflective apparatus according to a third embodiment of this application.
Figure 9B:
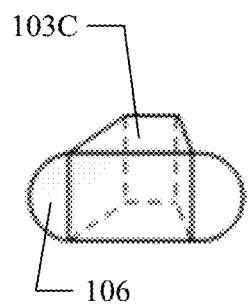
Figure 9C:
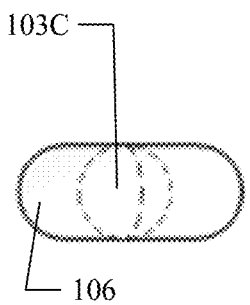

With reference to FIG. 9A to FIG. 9C, in a third implementation of this application, a light reflective apparatus 103C is a reflector, and the electronic device 100 further includes a carrier 106. The light reflective apparatus 103C is fixedly mounted on the carrier 106. The carrier 106 is detachably mounted on the rear cover 101 and corresponds to the rear-facing camera 193B. In this implementation, the light reflective apparatus 103C may be in a trapezoidal shape (with reference to FIG. 9B), or may be in a hemispheric shape (with reference to FIG. 9C). In another implementation, the light reflective apparatus 103C may be in another shape, for example, a triangular shape or a cylindrical shape. This is not limited herein. When the light reflective apparatus 103C is in the usage state, the carrier 106 is mounted on the rear cover 101, so that the light reflective apparatus 103C is located between the rear-facing camera 193B and the carrier 106. In this case, the rear-facing camera 193B can capture the picture in the light reflective apparatus 103C. When the light reflective apparatus 103C is in the idle state, the carrier 106 is separated from the rear cover 101, that is, the carrier 106 is detached from the rear cover 101. In this case, the rear-facing camera 193B can capture the picture in the direction in which the rear-facing camera 193B is located. In some implementations, the carrier 106 may be a lens protection cover 105.

In some implementations, to prevent fitting between the light reflective apparatus 103C and the rear-facing camera 193B and ensure a distance between the light reflective apparatus 103C and the rear-facing camera 193B, the electronic device 100 further includes a fixing support 107, and the fixing support 107 is supported between the carrier 106 and the rear cover 101.

In some implementations, the carrier 106 may be further connected to the rear cover 101 in a sliding manner. When the light reflective apparatus 103C is in the usage state, the carrier 106 slides and approaches to a side of the rear-facing camera 103C, so that the light reflective apparatus 103C is located between the rear-facing camera 193B and the carrier 106. In this case, the rear-facing camera 193B can capture the picture in the light reflective apparatus 103C. When the light reflective apparatus 103C is in the idle state, the carrier 106 slides and moves away from a side of the rear-facing camera 103C. In this case, the rear-facing camera 193B can capture the picture in the direction in which the rear-facing camera 193B is located.

Figure 10A:
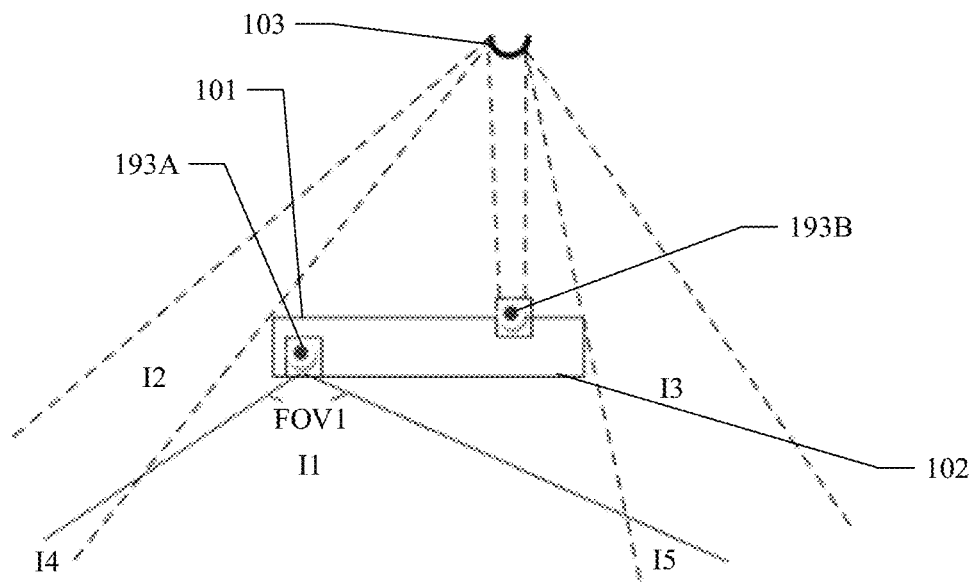
FIG. 10A and FIG. 10B are schematic diagrams of optical paths of a light reflective apparatus according to an embodiment of this application.
Figure 10B:
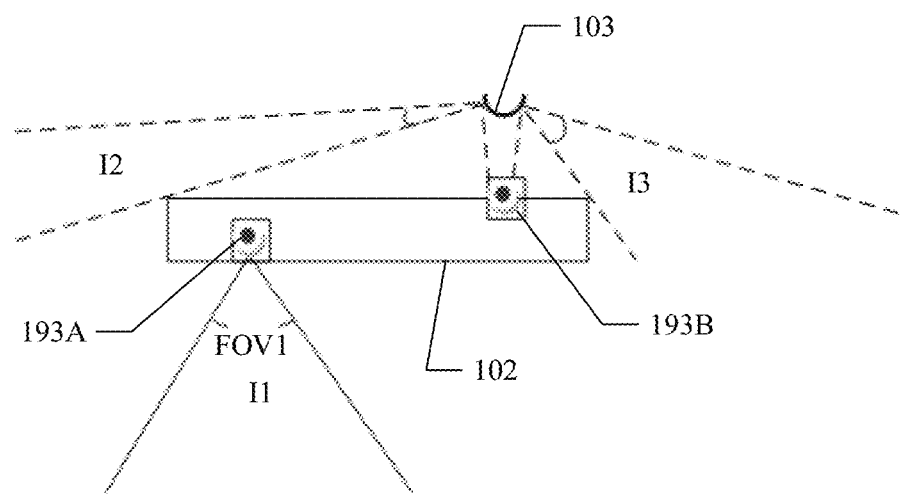

The following describes a relationship between the picture captured by the front-facing camera 193A and the picture captured by the rear-facing camera 193B by using the light reflective apparatus. With reference to FIG. 10A, when the light reflective apparatus 103 is in the usage state, the picture in the direction in which the front-facing camera 193A is located is imaged in the light reflective apparatus 103. The rear-facing camera 193B can obtain, through capturing the picture in the light reflective apparatus 103, the picture in the direction in which the front-facing camera 193A is located. As shown in FIG. 10A, only pictures on both sides of the body of the electronic device 100 are reflected into the light reflective apparatus 103 due to blocking of the body of the electronic device 100. The pictures are captured by the rear-facing camera 193B. To seamlessly connect the picture captured by the front-facing camera 193A and the picture captured by the rear-facing camera 193B during fusion (with no blind zone), in some implementations, an overlapping region should exist between the picture captured by the rear-facing camera 193B and the picture captured by the front-facing camera 193A. As shown in FIG. 10A, an overlapping region I4 exists between I2 and I1, and an overlapping region I5 exists between I3 and I1. Whether an overlapping region exists between I1 and each of I2 and I3 depends on a distance between the light reflective apparatus 103 and the rear cover 101. As shown in FIG. 10B, when the distance between the light reflective apparatus 103 and the rear cover 101 is relatively small, no overlapping region exists between I1 and each of I2 and I3.

The following describes in detail how to determine the distance between the light reflective apparatus 103 and the rear cover 102 to ensure that the overlapping region exists between the front-facing camera 193A and the rear-facing camera 193B.

Figure 11A:
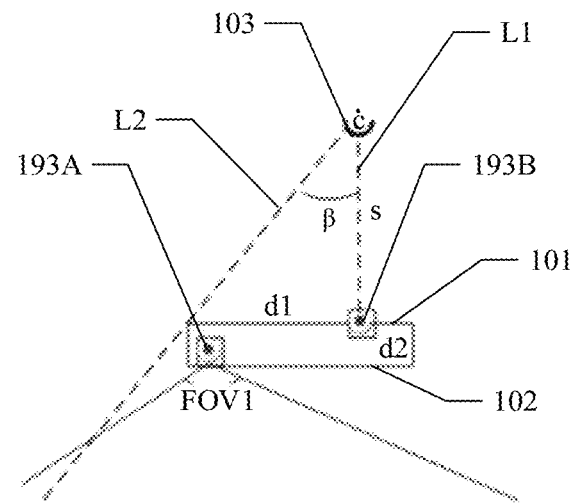
FIG. 11A to FIG. 11B are schematic diagrams of setting a distance between a light reflective apparatus and a rear-facing camera according to an embodiment of this application.

In some implementations, for example, the light reflective apparatus 103 is a convex lens. As shown in FIG. 11A, it is assumed that a field of view of the front-facing camera 193A is FOV1, a distance between the rear-facing camera 193B and one side edge of the electronic device 100 is d1, a distance between the rear-facing camera 193B and the other side edge of the electronic device 100 is d2, a distance between an optical center of the light reflective apparatus 103 and a lens surface is c, and a distance between the lens surface and the rear-facing camera 193B is s. In this case, the following may be obtained: a blocking angle $\beta$ of the light reflective apparatus 103 is arc tan d1/(s+c). The blocking angle $\beta$ indicates an angle between a line L1 connecting a center of the light reflective apparatus 103 to the rear-facing camera 193B and a line L2 connecting the center of the light reflective apparatus 103 to the side edge of the electronic device 100. In this implementation, for the rear-facing camera 193B, when the blocking angle $\alpha$ is greater than or equal to FOV1/2, a case in FIG. 10B appears; or when the blocking angle $\beta$ is less than FOV1/2, a case in FIG. 10A appears. It can be learned from the foregoing relational expression of the blocking angle $\alpha$ that a magnitude of the blocking angle $\alpha$ is related to three values: d1, c, and s. After the electronic device 100 and the light reflective apparatus 103 are determined, d1 and c are specified values. In this case, a magnitude of the blocking angle $\alpha$ can be adjusted only through adjusting s. Therefore, s>d1/tan (FOV1/2)–c and s>d2/tan (F0V1/2)–c should be set.

It should be noted that, when the light reflective apparatus 103 is designed, due to a limitation brought by a volume of the electronic device 100 and a requirement for a compact design of each module, the distance c between the optical center and the lens surface is usually properly increased, to reduce the distance s between the lens surface and the rear-facing camera 193B as much as possible. In addition, to obtain a relatively clear picture, a focal length F (not shown in the figure) of the light reflective apparatus 103 needs to be minimized.

Figure 11B:
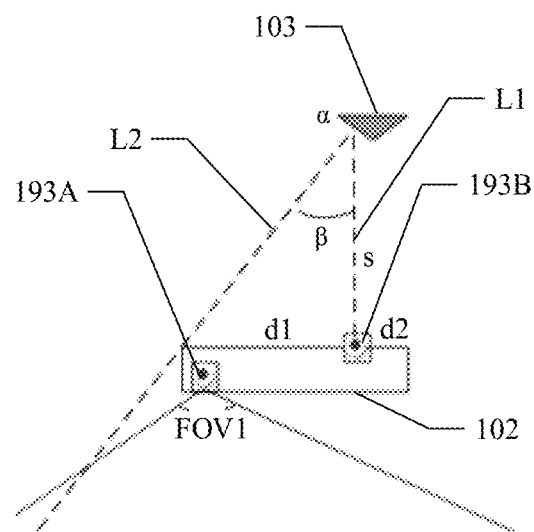

In some other implementations, for example, the light reflective apparatus 103 is a reflective prism (for example, a reflective triangular prism). As shown in FIG. 11B, in this implementation, because a reflector is used to implement plane reflection, when the distance between the light reflective apparatus 103 and the rear-facing camera 193B is excessively large, the picture in the direction of the front-facing camera 193A cannot be captured by the rear-facing camera 193B although the picture is reflected to the light reflective apparatus 103. It is assumed that an included angle between an imaging plane of the light reflective apparatus 103 and a horizontal plane of the light reflective apparatus 103 is $\alpha$. In this case, if a picture formed through the connection line L2 can be captured by the rear-facing camera 193B, it should be ensured that the blocking angle $\beta>2\alpha$. In addition, $\beta$ should be further less than FOV1/2, that is, $2\alpha$ should be less than FOV1/2. This is similar to a principle used when the light reflective apparatus 103 is a convex lens. Therefore, in this implementation, s>d1/tan (2$\alpha$) and s>d2/tan(2$\alpha$) should be set.

Figure 12:
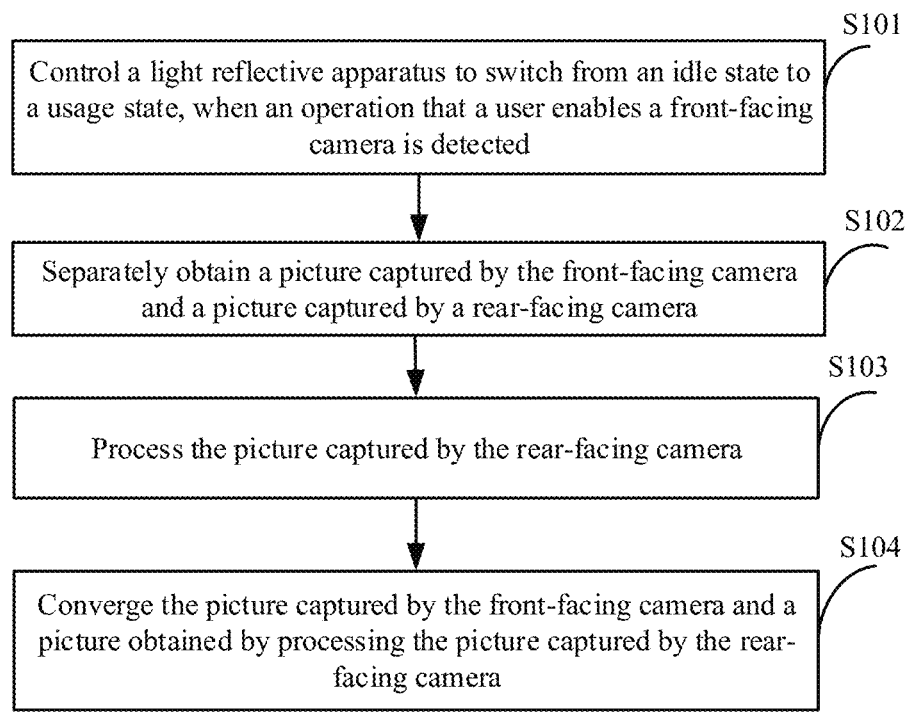
FIG. 12 is a flowchart of a picture processing method according to an embodiment of this application.

FIG. 12 is a flowchart of a picture processing method according to an embodiment of this application. The picture processing method is applied to the electronic device 100 shown in FIG. 1. The picture processing method includes the following steps.

Step S101: Control a light reflective apparatus to switch from an idle state to a usage state, when an operation that a user enables a front-facing camera is detected.

That the light reflective apparatus is in the usage state indicates: the light reflective apparatus is located on an object-facing side of a rear-facing camera 193B and is configured to reflect a picture in a direction in which the front-facing camera 193A is located, so that the rear-facing camera 193B captures a picture in the light reflective apparatus. The object-facing side indicates a side on which the rear-facing camera 193B faces a photographed object.

In an implementation of this application, a normal state of the light reflective apparatus 103 is the idle state. When the user makes a video call by using instant messaging software, if the operation that the user enables the front-facing camera 193A is detected, it indicates that the user wants to make the video call with a peer user by using the front-facing camera 193A. In this case, the picture processing method should be performed to expand a field of view of a picture taken by the front-facing camera 193A, to improve video call experience of the user.

In some implementations, to meet different experience requirements of the user, step S101 specifically includes: when the operation that the user enables the front-facing camera is detected, determining a state of a peer electronic device 100; and when it is determined that the peer electronic device 100 is in a landscape mode, controlling the light reflective apparatus to switch from the idle state to the usage state. The "landscape mode" indicates a mode in which a length of the electronic device 100 in a horizontal direction is greater than a length of the electronic device 100 in a vertical direction.

Step S102: Separately obtain a picture captured by the front-facing camera and a picture captured by the rear-facing camera.

Step S103: Process the picture captured by the rear-facing camera.

In some implementations, the processing the picture captured by the rear-facing camera 193B specifically includes: performing picture restoration on the deformed picture captured by the rear-facing camera 193B, and/or removing a picture corresponding to the rear cover part 101. For example, when the reflective apparatus 103 is a convex lens, a picture reflected to the reflective apparatus 103 may be deformed. In this case, the rear-facing camera 193B takes the deformed picture. Therefore, it is necessary to restore the deformed picture to an original picture by using a restoration algorithm. In addition, due to blocking of the rear cover 101, the light reflective apparatus 103 reflects the picture of the rear cover 101. Therefore, this part of picture needs to be processed for better subsequent fusion with the picture taken by the front-facing camera 193B.

Step S104: Fuse the picture captured by the front-facing camera and a picture obtained by processing the picture captured by the rear-facing camera.

Figure 13A:
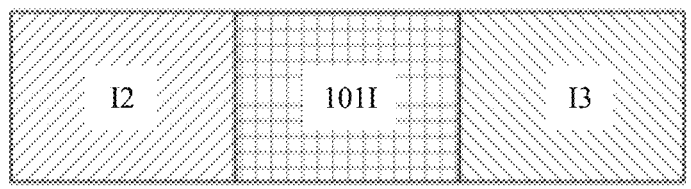
FIG. 13A is a schematic composition diagram of a picture captured by a rear-facing camera according to an embodiment of this application.

With reference to FIG. 10A and FIG. 13A, in some implementations, the picture captured by the rear-facing camera 193B includes a first front picture region I2, a rear cover picture region 1011, and a second front picture region I3. The first front picture region I2 and the second front picture region I3 are pictures that are in a direction in which the front-facing camera 193A is located, that are reflected by the light reflective apparatus 103, and that are taken by the rear-facing camera 193B. The rear cover picture region 1011 indicates a picture part that is of the rear cover 101, that is reflected by the light reflective apparatus 103, and that is taken by the rear-facing camera 193B. It may be learned from FIG. 13A that only the first front picture region I2 and the second front picture region I3 can be used to increase the field of view of the picture taken by the front-facing camera 193A, and the rear cover picture region 1011 is an object to be processed in step S103.

Figure 13B:
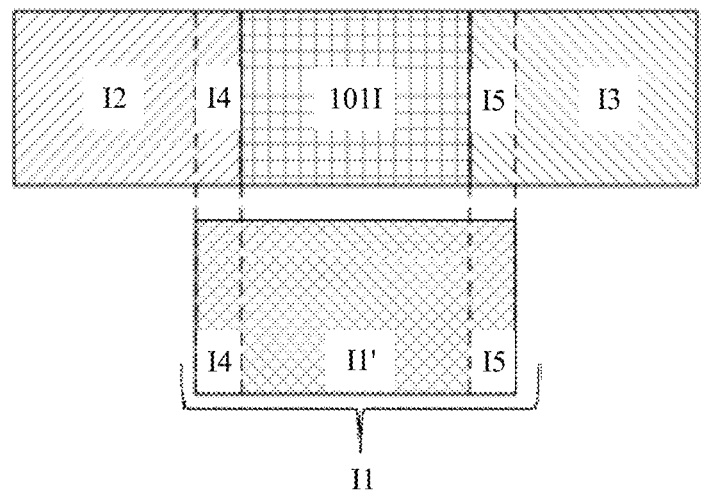
FIG. 13B is a schematic diagram of comparison between a picture captured by a front-facing camera and a picture captured by a rear-facing camera according to an embodiment of this application.

Further with reference to FIG. 10A and FIG. 13B, in some implementations, the picture I1 captured by the front-facing camera 193A includes an independent region I1', a first overlapping region I4, and a second overlapping region I5. The first overlapping region I4 indicates an overlapping region between the picture I1 and the first front picture region I2. The second overlapping region I5 indicates an overlapping region between the picture I1 and the second front picture region I3. In this implementation, the first front picture region I2 includes the first overlapping region I4. The second front picture region I3 includes the second overlapping region I5. It may be learned from FIG. 13A and FIG. 13B that, in step S104, the first overlapping region I4 and the second overlapping region I5 should be first found, to better fuse the picture taken by the front-facing camera 193A and the picture taken by the rear-facing camera 193B.

Figure 14:
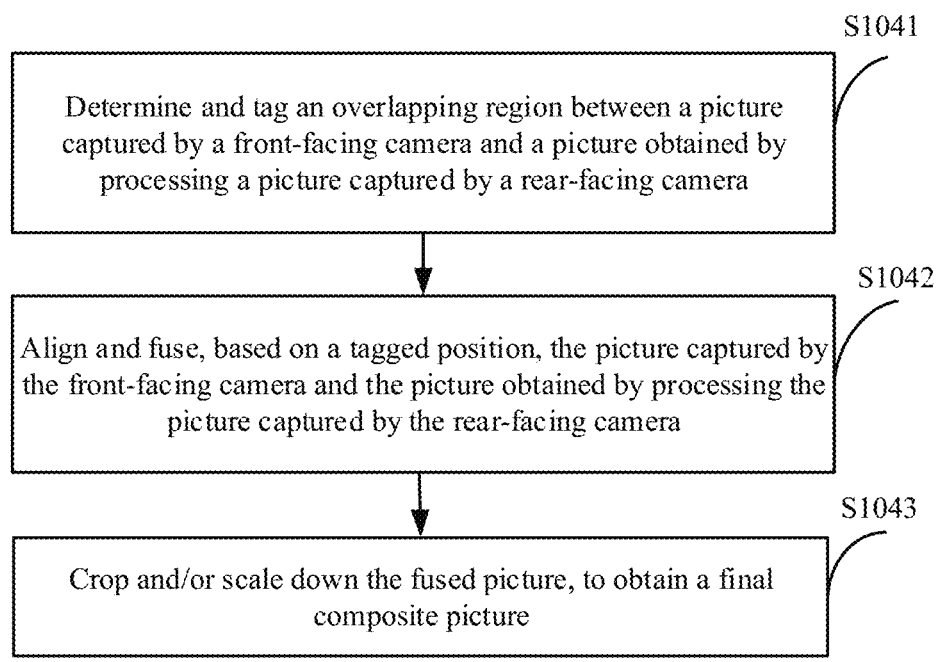
FIG. 14 is a sub-flowchart of step S104 in FIG. 12.

With reference to FIG. 14, in some implementations, step S104 specifically includes the following steps.

Step S1041: Determine and tag an overlapping region between the picture captured by the front-facing camera and the picture obtained by processing the picture captured by the rear-facing camera.

Specifically, regions with consistent picture pixels are found from the processed picture obtained after the picture captured by the rear-facing camera 193B is processed and the picture captured by the front-facing camera 193A, and the regions with consistent picture pixels are separately marked as the first overlapping region I4 and the first overlapping region I5.

Step S1042: Align and fuse, based on a tagged position, the picture captured by the front-facing camera and the picture obtained by processing the picture captured by the rear-facing camera.

Based on a tagged result, the processed picture obtained after the picture captured by the rear-facing camera 193B is processed is aligned with the picture captured by the front-facing camera 193A. The alignment is separately aligning the first overlapping region I4 of the processed picture obtained after the picture captured by the rear-facing camera 193B is processed, with the first overlapping region I4 of the picture captured by the front-facing camera 193A; and aligning the second overlapping region I5 of the processed picture obtained after the picture captured by the rear-facing camera 193B is processed, with the second overlapping region I5 of the picture captured by the front-facing camera 193A. Then, the two pictures are spliced and fused by using the overlapping regions as a reference.

Figure 15:
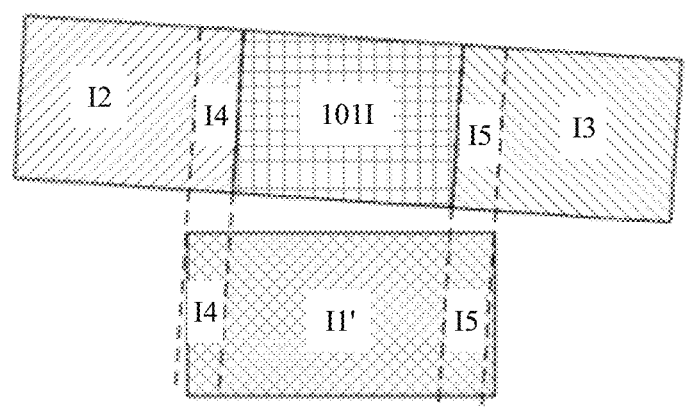
FIG. 15 is a schematic diagram of comparison between a picture captured by a front-facing camera and a picture captured by a rear-facing camera according to another embodiment of this application.

With reference to FIG. 15, in a process of aligning the processed picture obtained after the picture captured by the rear-facing camera 193B is processed and the picture captured by the front-facing camera 193A, the following case exists: the picture captured by the rear-facing camera 193B and the picture captured by the front-facing camera 193A may have geometric deformation, or are not at the same horizontal height. In this case, the two pictures need to be processed, so that the two pictures present a state shown in FIG. 13B. Therefore, in some implementations, operations such as geometric restoration, scaling, and partition may be performed on the picture captured by the rear-facing camera 193B, to restore the picture to an initial state in FIG. 13B. For example, it is assumed that the original picture captured by the rear-facing camera 193B is P1, and a geometric restoration parameter matrix is G. In this case, geometric restoration is performed on P1, to obtain P2=P1*G. Then, scaling is performed on P2, and a scaling coefficient is S, to obtain P3=P2*S. Finally, partition is performed on P3 to obtain P4, and alignment is performed.

Step S1043: Crop and/or scale down the fused picture, to obtain a composite picture.

In some implementations, a height of the processed picture obtained after the picture captured by the rear-facing camera 193B is processed may be the same as or different from a height of the picture captured by the front-facing camera 193A. When the height of the processed picture obtained after the picture captured by the rear-facing camera 193B is processed is the same as the height of the picture captured by the front-facing camera 193A, the fused picture has a consistent height. Therefore, the fused picture does not need to be cropped. A requirement of a current display window can be met through scaling down the fused picture.

Figure 16:
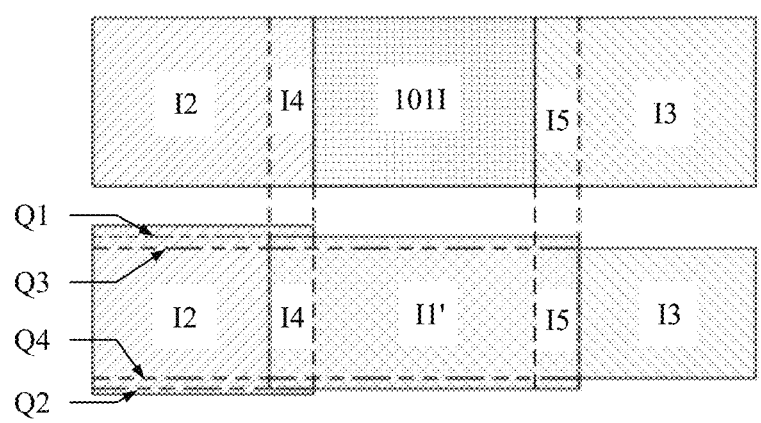
FIG. 16 is a schematic diagram of fusion and partition of a picture captured by a front-facing camera and a picture captured by a rear-facing camera according to an embodiment of this application.

When the height of the processed picture obtained after the picture captured by the rear-facing camera 193B is processed is different from the height of the picture captured by the front-facing camera 193A, the height of the picture with the smaller height is used as a reference height, and the picture with the height exceeding the reference height is cropped. As shown in FIG. 16, when the height of the processed picture obtained after the picture captured by the rear-facing camera 193B is processed is greater than the height of the picture captured by the front-facing camera 193A, that is, when a height of I2 (I3) is greater than a height of I1, a height of I1' is used as a reference height, and I2 and I3 are respectively cropped by using a first cropping line Q1 and a second cropping line Q2. When the height of the processed picture obtained after the picture captured by the rear-facing camera 193B is processed is less than the height of the picture captured by the front-facing camera 193A, that is, when a height of I2 (I3) is less than a height of I1, a height of I2 and a height of I3 are used as a reference height, and I1' is cropped by using a third cropping line Q3 and a fourth cropping line Q4. It should be noted that, because both I2 and I3 are the pictures captured by the rear-facing camera 193B, I2 and I3 have the same height.

According to the electronic device 100 provided in this embodiment of this application, when the "FOV expansion" function is enabled and the user makes the video call by using the instant messaging software, the electronic device 100 performs the picture processing method, so that the composite picture can be displayed in the display region 403 for the picture of the local user on the local electronic device 100 and the display region 402 for the picture of the peer user on the peer electronic device 100, to expand the field of view of the picture captured by the front-facing camera 193A of the local electronic device 100. In this way, during the video call, the peer user can see more about the local user, instead of only a picture of the upper part of the local user, to improve video call experience of the user.

It should be noted that the internal memory 121 in the foregoing embodiment may store program instructions, and the program instructions are invoked by the processor 110 to perform the picture processing method in this embodiment of this application.

It should be noted that, for brief description, the foregoing method embodiments are represented as a series of actions. However, a person skilled in the art should appreciate that this application is not limited to the described order of the actions, because according to this application, some steps may be performed in other orders or simultaneously.

In the foregoing embodiments, the descriptions of the embodiments have respective focuses. For a part that is not described in detail in an embodiment, refer to related descriptions in other embodiments.

A sequence of the steps of the method in the embodiments of this application may be adjusted, combined, or removed based on an actual requirement.

The picture processing method provided in this application may be implemented in hardware or firmware, or may be used as software or computer code that may be stored in a computer-readable storage medium such as a read-only memory (ROM), a random access memory (RAM for short), a floppy disk, a hard disk, or a magneto-optical disk, or may be used as computer code that is originally stored in a remote recording medium or a non-transitory machine readable medium, downloaded by using a network, and stored in a local recording medium. Therefore, the method described herein may be presented by using a general-purpose computer, a special processor, or programmable or dedicated hardware such as an application-specific integrated circuit (ASIC) or a field programmable gate array (FPGA). It can be understood in the art that a computer, a processor, a microprocessor, a controller, or programmable hardware includes a storage component such as a RAM, a ROM, or a flash memory. When a computer, a processor, or hardware implements the processing method described herein to access and execute software or computer code, the memory component may store or receive software or computer code. In addition, when a general-purpose computer stores code used to implement the processing herein, execution of the code enables changing the general-purpose computer to a dedicated computer used to perform the processing herein. The computer-readable storage medium may be a solid-state memory, a storage card, an optical disk, or the like. The computer-readable storage medium stores program instructions to be invoked by a computer, a mobile phone, a tablet computer, or an electronic device in this application to perform the picture processing method.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An electronic device, comprising:
    a rear cover;
    a front-facing camera;
    a rear-facing camera;
    a processor; and
    a light reflective apparatus connected to the rear cover via a drive component, wherein the light reflective apparatus may be switched, by operation of the drive component, between a usage state and an idle state,
    wherein the light reflective apparatus is configured, in the usage state, to reflect light from a direction corresponding with the front-facing camera toward the rear-facing camera to capture at least one picture of the light reflected by the light reflective apparatus using the rear-facing camera, wherein the light reflective apparatus is located on a side of the electronic device corresponding to the rear-facing camera, and is configured to reflect the light from the direction corresponding with the front-facing camera toward the rear-facing camera to capture the at least one picture of the light reflected by the light reflective apparatus using the rear-facing camera, and wherein the idle state of the light reflective apparatus enables the rear-facing camera to capture at least one picture of light reflected by an object located on the side of the electronic device corresponding to the rear-facing camera without the light reflected by the object being reflected by the light reflective apparatus,
    and wherein the processor is configured to:
    control the light reflective apparatus to switch from the idle state to the usage state, responsive to detecting an operation that enables the front-facing camera,
    separately obtain a first picture captured by the front-facing camera and a second picture captured by the rear-facing camera with the light reflective apparatus in the usage state;
    processing the second picture captured by the rear-facing camera to generate a third picture; and
    fusing the first picture captured by the front-facing camera and the third picture.

2. The electronic device according to claim 1, wherein the light reflective apparatus is a light reflective film made of a flexible material, and wherein the light reflective apparatus is switched between the usage state and the idle state by rotating the light reflective apparatus using the drive component.

3. The electronic device according to claim 2, wherein:
    the drive component comprises a drive part, a convey part, and a fastener;
    one end of the convey part is mounted on the drive part and the other end of the convey part is connected to the fastener;
    the light reflective apparatus is disposed at an end of the fastener that is away from the convey part; and the drive part is configured to drive the convey part to rotate to drive the fastener to move and further drive the light reflective apparatus.

4. The electronic device according to claim 3, wherein the drive part is further configured to:
drive the convey part to rotate to drive the fastener to move and further drive the light reflective apparatus to move between the usage state and the idle state.

5. The electronic device according to claim 2, wherein the electronic device further comprises:
a lens protection cover that is mounted on the rear cover and corresponds to the rear-facing camera, and wherein the light reflective apparatus is in a specified shape and is fitted to an inner wall of the lens protection cover in the usage state.

6. A picture processing method, applied to an electronic device, wherein the electronic device comprises a rear cover, a front-facing camera, and a rear-facing camera, wherein the electronic device further comprises a light reflective apparatus comprising a light reflective film connected to the rear cover via a drive component, and wherein the light reflective apparatus may be switched, via operation of the drive component, between a usage state and an idle state, and wherein the picture processing method comprises:
controlling the light reflective apparatus to switch from the idle state to the usage state, responsive to detecting an operation that enables the front-facing camera, wherein the usage state of the light reflective apparatus indicates that the light reflective apparatus is located on a side of the electronic device corresponding to the rear-facing camera and is configured to reflect light from the front-facing camera toward the rear-facing camera to capture at least one picture of the light reflected by the light reflective apparatus using the rear-facing camera, and wherein the idle state of the light reflective apparatus enables the rear-facing camera to capture at least one picture of light reflected off an object located on the side of the electronic device corresponding to the rear-facing camera without the light reflected off the object being reflected by the light reflective apparatus;
separately obtaining a first picture captured by the front-facing camera and a second picture captured by the rear-facing camera;
processing the second picture captured by the rear-facing camera to generate a third picture; and
fusing the first picture captured by the front-facing camera and the third picture.

7. The picture processing method according to claim 6, wherein the processing the second picture captured by the rear-facing camera specifically comprises: performing picture restoration on a deformed portion of the second picture captured by the rear-facing camera, and/or removing a portion of the second picture corresponding to the rear cover.

8. The picture processing method according to claim 6, wherein the fusing the first picture captured by the front-facing camera and the third picture obtained by processing the second picture captured by the rear-facing camera comprises:
determining and tagging an overlapping region between the first picture captured by the front-facing camera and the third picture obtained by processing the second picture captured by the rear-facing camera;
aligning and fusing, based on a tagged position, the first picture captured by the front-facing camera and the third picture obtained by processing the second picture captured by the rear-facing camera; and
cropping and/or scaling down the fused picture, to obtain a composite picture.

9. The picture processing method according to claim 8, wherein responsive to determining that a height of the third picture obtained by processing the second picture captured by the rear-facing camera is different from a height of the first picture captured by the front-facing camera, the height of the picture with the smaller height is used as a reference height, and the picture with the height exceeding the reference height is cropped.

10. The picture processing method according to claim 6, wherein the controlling the light reflective apparatus to switch from the idle state to the usage state, responsive to detecting the operation that enables the front-facing camera comprises:
responsive to detecting the operation that enables the front-facing camera, determining a state of a peer electronic device; and responsive to determining that the peer electronic device is in a landscape mode, controlling the light reflective apparatus to switch from the idle state to the usage state.

* * * * *

UNITED STATES PATENT AND TRADEMARK OFFICE
CERTIFICATE OF CORRECTION

PATENT NO. : 11,974,052 B2
APPLICATION NO. : 17/520490
DATED : April 30, 2024
INVENTOR(S) : Jing Xiao et al.

Page 1 of 1

It is certified that error appears in the above-identified patent and that said Letters Patent is hereby corrected as shown below:

In the Claims

Claim 6, Column 33, Line 33 reads as: "from the front-facing camera toward the rear-facing" should read as: -- from a direction corresponding with the front-facing camera toward the rear-facing --

Signed and Sealed this
Twenty-second Day of April, 2025

Coke Morgan Stewart
*Acting Director of the United States Patent and Trademark Office*